（12） United States Patent
Glibbery et al.

(10) Patent No.: US 11,239,783 B2
(45) Date of Patent: Feb. 1, 2022

(54) SYSTEMS AND METHODS FOR MOTOR PARAMETER EXTRACTION

(71) Applicant: Analog Devices International Unlimited Company, Limerick (IE)

(72) Inventors: Adam James Glibbery, Paterna (ES); Javier Calpe Maravilla, Valencia (ES)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/919,186

(22) Filed: Jul. 2, 2020

(65) Prior Publication Data

US 2021/0021221 A1 Jan. 21, 2021

Related U.S. Application Data

(60) Provisional application No. 62/874,845, filed on Jul. 16, 2019.

(51) Int. Cl.
*H02P 21/22* (2016.01)
*H02P 21/00* (2016.01)
*H02P 27/12* (2006.01)
*H02P 21/18* (2016.01)
*H02P 21/13* (2006.01)

(52) U.S. Cl.
CPC .......... *H02P 21/22* (2016.02); *H02P 21/0017* (2013.01); *H02P 21/13* (2013.01); *H02P 21/18* (2016.02); *H02P 27/12* (2013.01)

(58) Field of Classification Search
CPC .............................. H02P 21/22; H02P 21/0017
USPC ................................ 318/400.02, 400.01, 700
See application file for complete search history.

(56) References Cited

U.S. PATENT DOCUMENTS

| | | | |
|---|---|---|---|
| 6,924,613 B2* | 8/2005 | Jonsson | H02P 29/02 318/432 |
| 7,184,902 B2 | 2/2007 | El-Ibiary | |
| 7,308,383 B2* | 12/2007 | Zuzuly | H04Q 9/00 318/727 |
| 7,342,371 B2* | 3/2008 | Zuzuly | B66B 1/24 187/247 |
| 2004/0027760 A1 | 2/2004 | Villaret | |
| 2018/0062549 A1 | 3/2018 | Murray et al. | |

\* cited by examiner

*Primary Examiner* — David Luo
(74) *Attorney, Agent, or Firm* — Schwegmann Lundberg & Woessner, P.A.

(57) ABSTRACT

Systems and methods for extracting motor operational state parameters from an electric motor for improved motor control and motor fault or failure detection are discussed. An exemplary system includes an excitation circuit to apply a drive voltage to an electric motor, and a processor circuit to measure a resulting winding current, extract a current waveform by oversampling the winding current in an entire PWM frame at a sampling rate higher than the PWM frequency, and fit the current waveform in the PWM period to a parametric model. The processor circuit can determine a motor operational state parameter using one or more of the applied drive voltage or the parametric model of the winding current.

25 Claims, 14 Drawing Sheets

| VECTOR | $V_a$ | $V_b$ | $V_c$ |
|---|---|---|---|
| V100 | $V_{dc}$ | 0 | 0 |
| V101 | $V_{dc}$ | 0 | $V_{dc}$ |
| V001 | 0 | 0 | $V_{dc}$ |
| V011 | 0 | $V_{dc}$ | $V_{dc}$ |
| V010 | 0 | $V_{dc}$ | 0 |
| V110 | $V_{dc}$ | $V_{dc}$ | 0 |
| V000 | 0 | 0 | 0 |
| V111 | $V_{dc}$ | $V_{dc}$ | $V_{dc}$ |

SYSTEMS AND METHODS FOR MOTOR PARAMETER EXTRACTION

CLAIM OF PRIORITY

This application claims the benefit of priority to U.S. Provisional Application Ser. No. 62/874,845, filed Jul. 16, 2019 which is herein incorporated by reference in its entirety.

TECHNICAL FIELD

This document relates generally to machine condition monitoring, and more particularly to extracting parameters of an electric motor for improved motor operating condition analysis and motor control.

BACKGROUND

A motor converts electrical energy into rotational mechanical energy. Various types of motors are in common use. An alternating current (AC) motor includes motor windings located on a stationary stator, and a rotor that includes current-carrying conductors, permanent magnets, or other means for producing a rotating magnetic field. During operation, alternating currents can be supplied to the motor windings to generate magnetic fields, which in turn can cause the rotor to rotate, such as for turning a motor shaft. Direct current (DC) motors are powered from DC power and are mechanically commutated machines. DC motors have a voltage induced rotating armature winding, and a non-rotating armature field frame winding that is a static field, or permanent magnet. Brushless DC (BLDC) motors were developed from conventional brushed DC motors, and feature high efficiency and excellent controllability. The "brushless" part of a BLDC generally refers to a lack of commutator or field winding ring brushes, BLDC. BLDC motors have similar construction and operation as synchronous AC motors. A BLDC motor is powered by DC electricity. The DC voltage goes through an inverter to produces an alternating current to drive each phase of the motor via a closed loop controller. The controller provides the current to the motor windings that control the speed and torque of the motor.

Some motor systems have a current control circuit to ensure proper operation, such that a phase current follows a reference. The tuning of current control can be based on motor parameters such as inductance, resistance, or magnetization, among others. Determination and proper characterization of motor parameters can help optimize tuning of the current control. Additionally, because the motor parameters are related to physical properties of the motor, the motor parameters can be used to detect or predict a fault or motor failure. Improper or inaccurate characterization of motor parameter can lead to false detection or misdiagnosis of a fault.

OVERVIEW

Motor operational state parameters can be used for feedback control of current during the operation of a motor. For example, a rise time, overshoot, or settling time can be optimized based on the determined motor parameters. Non-linear behavior of the motor can be compensated for based on the determined motor parameters. For example, magnetizing inductance can vary strongly with rotor angle, as it depends on the air gap which in turn depends on the motor construction. In another example, the torque produced by the motor can be a non-linear function of the motor current because of saturation of the inductance of the motor. In such an example where the inductance is determined, the torque produced by the motor can be compensated to always have a linear relationship with the motor current. Such compensation for non-linear behavior can be important in automotive applications or hoist/crane applications. In certain systems, the current or voltage in the motor windings can be monitored, and the motor can be de-energized to avoid unsafe conditions if the average value of current or voltage exceeds a threshold.

The windings of a motor deliver power, and can be driven by a pulse width modulated (PWM) voltage drive to stop unreasonable amounts of power being dissipated in the drivers due to the large currents. The PWM signal is used to generate an analog signal using a digital source. Among others, PWM frequency (or PWM period) is a parameter that determines how fast the PWM completes a cycle of high and low states. By cycling a digital signal on and off at a fast rate, the output will appear to behave like a constant voltage analog signal when providing power to devices. In some systems, average values of voltage and current can be determined based on sampling once per pulse width modulation (PWM) period and are sufficient for protection. However, in high performance systems, a first derivative (i.e., a slope) of current or voltage may be used to improve performance. The slope of current in the motor winding currents can indicate when fault conditions exist, because usually, the inductance of the windings limits the slope of the winding current. However, the slope of the winding current is prone to noise at high frequency and electrical noise from the power inverter can couple into the feedback path and contribute to errors. The slope of the winding current is, in the general case, not suitable for inductance estimation so alternative approaches that can be used can include AC signal injection, or separate current derivative sensors. The present inventors have recognized, among other things, that there is a need for improved techniques for characterizing and analyzing the winding current and drive voltage driving the motor, and improved techniques for determining one or more motor parameters, such as inductance.

The present document discusses, among other things, improved systems, devices, and methods for sampling one or more of a driving voltage or a winding current, among others, and determining motor parameters from the sampled voltage or the sampled winding current. The motor parameters can be used for optimal tuning of a current control loop during operation of the motor and overload protection. An exemplary motor control system may include an excitation circuit configured to apply a drive voltage to an electric motor, and a processor circuit configured to measure a winding current from the electric motor responsive to the applied drive voltage, and to determine a motor parameter using one or more of the applied drive voltage or the measured winding current.

According to one aspect of the present document, the motor control system can extract a first current waveform of the measured winding current by sampling the measured winding current in an entire PWM period at a sampling rate higher than the PWM frequency, fit the first current waveform in a PWM period using a parametric model by updating one or more model parameters. The processor circuit can determine the motor parameters using the parametric model, such as the updated one or more model parameters.

According to another aspect of the present document, the motor control system can filter and sample the driving voltage in an entire PWM period at a sampling rate higher than the PWM frequency, and inverse-filter the voltage samples to compensate for voltage leakage between PWM frames (a PWM frame represents a timeframe of one cycle of a PWM signal, such as a PWM voltage signal). The processor circuit can determine the motor parameters using the compensated drive voltage.

Example 1 is a system for monitoring an operating condition of an electric motor that includes a stator and a rotor. The system comprises: an excitation circuit configured to apply a drive voltage to the electric motor; and a processor circuit configured to: measure a winding current from the electric motor in response to the applied drive voltage; and determine at least one parameter of an operational state of the motor using one or more of the applied drive voltage or the measured winding current.

In Example 2, the subject matter of Example 1 optionally includes the processor circuit that can be configured to: generate a parametric model to simulate the measured winding current, the parametric model including at least one model parameter; and determine the at least one motor operational state parameter by updating the at least one model parameter until the simulated winding current satisfies a specific condition relative to the measured winding current.

In Example 3, the subject matter of Example 2 optionally includes the drive voltage that can be a pulse-width modulation (PWM) voltage associated with a PWM period and a PWM frequency. The processor circuit can be configured to: extract a first current waveform of the measured winding current during a PWM period and a second current waveform of the simulated winding current during a PWM period; and update the at least one model parameter based on a similarity metric between the first and second current waveforms.

In Example 4, the subject matter of Example 3 optionally includes the processor circuit that can be configured to extract the first current waveform by sampling the measured winding current during an entirety of the PWM period at a current sampling rate higher than the PWM frequency.

In Example 5, the subject matter of Example 4 optionally includes the processor circuit that can include a successive-approximation register analog-to-digital converter (SAR-ADC) configured to sample and digitize the measured winding current at the current sampling rate.

In Example 6, the subject matter of any one or more of Examples 4-5 optionally includes the processor circuit that can be configured to: calculate an average current using the sampled measured winding current during at least a portion of a PWM period; and update the at least one model parameter using the calculated average current.

In Example 7, the subject matter of Example 6 optionally includes the processor circuit that can be configured to calculate the average current using the sampled measured winding current excluding an edge portion of the PWM period corresponding temporally to a voltage-switching edge of the drive voltage.

In Example 8, the subject matter of any one or more of Examples 2-7 optionally includes the at least one motor operational state parameter that can include one or more of: a winding ratio; a magnetizing inductance; a leakage inductance; a winding skin depth; or a winding resistance.

In Example 9, the subject matter of any one or more of Examples 1-8 optionally includes the processor circuit that can be further configured to estimate a rotor angle using the applied drive voltage, the measured winding current, and the determined at least one motor operational state parameter.

In Example 10, the subject matter of Example 9 optionally includes the drive voltage that can be a pulse-width modulation (PWM) voltage associated with a PWM period and a PWM frequency, and the processor circuit that can be configured to: determine values of the at least one model parameter at multiple different times during a PWM period; estimate, from the values of the at least one model parameter, respective rotor angles at the multiple different times during the PWM period.

In Example 11, the subject matter of any one or more of Examples 1-10 optionally includes the drive voltage that can be a pulse-width modulation (PWM) voltage associated with a PWM period and a PWM frequency. The drive voltage can include a voltage-switching edge representing a transition of a voltage level applied to the stator, and wherein the processor circuit is configured to determine the at least one motor operational state parameter using an average of the drive voltage within a PWM period.

In Example 12, the subject matter of Example 11 optionally includes the processor circuit that comprises: an analog filter configured to filter the drive voltage; an analog-to-digital converter configured to sample the filtered drive voltage during a PWM period at a sampling rate higher than the PWM frequency; and a digital filter configured to inverse-filter the sampled drive voltage; wherein the processor circuit is configured to compute the average drive voltage using the inverse-filtered digitized drive voltage in the PWM period.

In Example 13, the subject matter of Example 12 optionally includes the analog filter that can be a first-order resistor-capacitor (RC) filter.

In Example 14, the subject matter of any one or more of Examples 12-13 optionally includes the analog filter that can have a first transfer function, and the digital filter that can have a second transfer function representing a discrete-time realization of a reciprocal of the first transfer function.

In Example 15, the subject matter of any one or more of Examples 1-14 optionally includes the processor circuit that can be configured to generate an operating condition indication of the electric motor based at least on the determined at least one motor operational state parameter.

Example 16 is a method of monitoring an operating condition of an electric motor that includes a stator and a rotor. The method comprises steps of: applying a drive voltage to the electric motor; measuring a winding current from the electric motor in response to the applied drive voltage; and determining at least one parameter of an operational state of the motor using one or more of the applied drive voltage or the measured winding current.

In Example 17, the subject matter of Example 16 optionally includes determining the at least one motor operational state parameter that can include steps of: generating a parametric model to simulate the measured winding current, the parametric model including at least one model parameter; and determining the at least one motor operational state parameter by updating the at least one model parameter until the simulated winding current satisfies a specific condition relative to the measured winding current.

In Example 18, the subject matter of Example 17 optionally includes the drive voltage that can be a pulse-width modulation (PWM) voltage associated with a PWM period and a PWM frequency. The method comprises steps of extracting a first current waveform of the measured winding current during a PWM period and a second current waveform of the simulated winding current during a PWM period; and updating the at least one model parameter based on a similarity metric between the first and second current waveforms.

In Example 19, the subject matter of Example 18 optionally includes extracting the first current waveform that can include sampling the measured winding current during an entirety of the PWM period at a current sampling rate higher than the PWM frequency using a successive-approximation register analog-to-digital converter (SAR-ADC).

In Example 20, the subject matter of Example 19 optionally includes steps of: calculating an average current using the sampled measured winding current during at least a portion of a PWM period; and updating the at least one model parameter using the calculated average current.

In Example 21, the subject matter of any one or more of Examples 16-20 optionally includes the drive voltage that can be a pulse-width modulation (PWM) voltage associated with a PWM period and a PWM frequency. The drive voltage can include a voltage-switching edge representing a transition of a voltage level applied to the stator. The method comprises steps of: filtering the drive voltage using a low-pass analog filter; sampling the filtered drive voltage during a PWM period at a sampling rate higher than the PWM frequency; and inverse-filtering the sampled drive voltage using a digital filter; wherein the analog filter has a first transfer function, and the digital filter has a second transfer function representing a discrete-time realization of a reciprocal of the first transfer function.

In Example 22, the subject matter of Example 21 optionally includes determining the at least one motor operational state parameter includes using an average drive voltage of the inverse-filtered digitized drive voltage in the PWM period.

In Example 23, the subject matter of any one or more of Examples 16-22 optionally includes generating an operating condition indication of the electric motor based at least on the determined at least one motor operational state parameter.

Example 24 is a system for monitoring an operating condition of an electric motor that includes a stator and a rotor. The system comprises: an excitation circuit configured to apply a drive voltage to the electric motor, the drive voltage including a pulse-width modulation (PWM) voltage having a voltage-switching edge representing a transition of a voltage level applied to the stator; and a processor circuit that can include: an analog filter configured to filter the drive voltage; an analog-to-digital converter configured to sample the filtered drive voltage during a PWM period at a sampling rate higher than the PWM frequency; and a digital filter configured to inverse-filter the sampled drive voltage; wherein the processor circuit is configured to generate an average drive voltage using the inverse-filtered digitized drive voltage in the PWM period, and to determine at least one parameter of an operational state of the motor using the average drive voltage in the PWM period.

In Example 25, the subject matter of Example 24 optionally includes the processor circuit that can be further configured to: measure a winding current from the electric motor in response to the applied drive voltage; and estimate a rotor angle using the applied drive voltage, the measured winding current, and the determined at least one motor operational state parameter.

This Overview provides some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1:
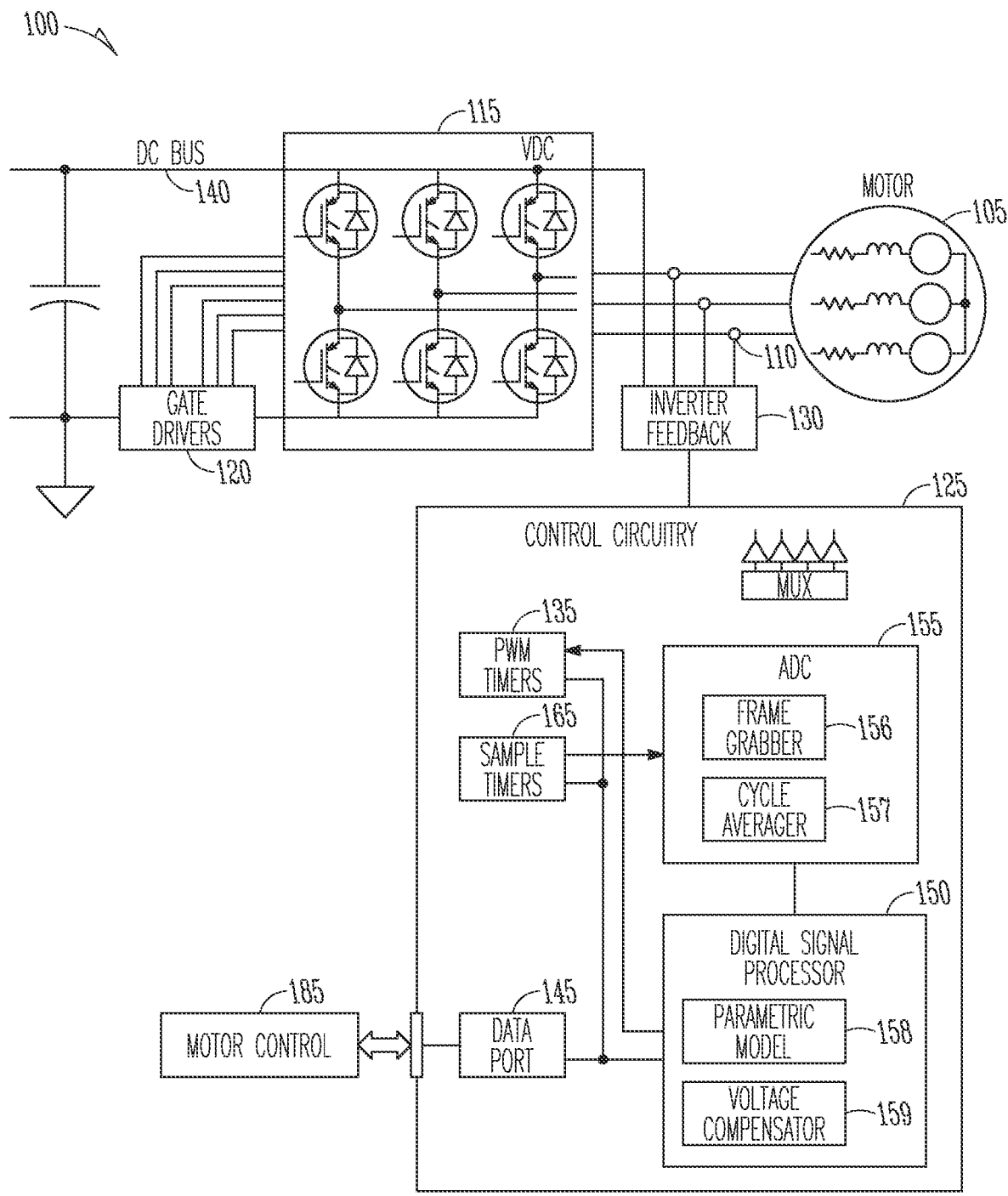
FIG. 1 is a diagram illustrating an example of a motor control system.

The parameters of a driven system are critical to understanding how the electrical input signals translate to physical behaviors. In a PWM driven system, an excitation signal (e.g., a voltage drive) may be applied to the system, and a response signal (e.g., a current signal) may be sensed. One or more system parameters may be determined using one or more of the excitation signal or the response signal.

The excitation signal or the response signal may be fitted to a parametric model, and the system parameters may be estimated using one or more parameters that describe the parametric model. For example, in a BLDC motor control system, magnetizing inductance ($L_m$) and drive voltage can determine the rate of change of current if driving a static winding. Within a quite enough time window where an input winding voltage is stable, the motor winding current may be linearly fit such as using a least-squares technique. Then, a value of $L_m$ can be calculated using the slope of the best-fit line. Such linear fitting approach, however, may face some challenges. For example, the drive voltage and the winding current can be substantially non-linear in a PWM frame, such as due to nonlinearity and rotor-angle dependency of the impedance of the motor. In some instances, a linear fitting would fit the winding current with sufficient accuracy only during very light driving situations. By linear fitting of only a portion rather than the entirety of a PWM frame, the motor parameters estimated from the fitted current may not represent with sufficient accuracy an actual motor operating condition, and thus provide diminished benefit in driving the motor. This in turn would produce errors in detecting or predicting motor faults or failures.

The present inventors have recognized an unmet need for systems and methods that can accurately extract motor parameters, particularly as the motor demonstrates nonlinear responses and rotor-angle dependency during the operation. The present document discusses systems and methods for grabbing an entire PWM frame of a response signal, such as winding current, and fitting said response signal using a parametric model. The parametric model can generate a simulated response signal, such as a simulation of the winding current. To determine an optimal model, one or more model parameters may be varied until the simulated response signal matches the measured response signal according to a pre-determined condition, such as morphological similarity condition, among other conditions.

The parametric fitting according to various embodiments as described in this document has several advantages. By simulating the full system, non-linear behaviors from capacitances, winding impedances, winding skin depth, drive non-idealities and the like can be accounted for. This has two key benefits. First, important parameters for characterizing motor operation, such as magnetizing inductance, may be fit using the complete set of samples during a PWM period. Magnetizing inductance generally changes with time and rotor angle, and can include substantial non-linear portions within a PWM frame. For example, out of 50 samples taken from an entire PWM frame, less than ten samples may form a linear portion. When fitting a larger number of samples from the entire PWM frame (rather than just a linear portion of it) to a parametric model, the parameter of the model can be far cleaner because of the larger number of samples. Second, sampling the response signal (e.g., winding current) from the entire PWM frame also allows for more accurate estimate of other motor parameters, such as those secondary to magnetizing induction but still important for characterizing motor operating condition. A full array of motor parameters can be used to characterize motor operating condition more accurately and to detect machine faults more reliably. Machine health and higher order corrections can also be implemented.

A current control loop can ensure proper operation of a motor, for example by ensuring that a phase current (also referred to as winding current) follows a reference. The tuning of parameters in the current control loop can be based on motor parameters such as inductance, resistance, or magnetization. The techniques of motor parameter extraction and analysis as discussed in this document may help achieve more precise current control. Additionally, the extracted motor parameters may improve detection or prediction of motor faults or failures. For example, parametric fitting of winding current and/or other parameters may be used to detect winding failures (e.g., shorts from insulation failure/contamination or loose wedges), rotor bar breakages, misalignment, temperature changes, or physical change such as stator damage, among other anomalies.

FIG. 1 is a diagram illustrating an example of a motor control system 100. The motor control system 100 can include a motor 105, one or more sensors 110, a power inverter 115, one or more gate drivers 120, control circuitry 125, inverter feedback circuitry 130, and motor control circuitry 185. Examples of the motor 105 may include an AC motor, or a DC motor such as a BLDC motor. The power inverter 115 can include one or more transistors 116. The control circuitry 125 can include one or more pulse width modulation (PWM) timers 135, one or more sample timers 165, a data port 145, a digital signal processor 150, and an analog-to-digital converter (ADC) 155. The DC bus 140 can be electrically coupled to the power inverter 115 and the transistors 116. The transistors 116 can be electrically coupled to windings of the motor 105. The sensors 110 can be coupled to the electrical connection between the power inverter 115 and the motor 105. The sensors 110 can be electrically coupled or magnetically coupled to the connection between the power inverter 115 and the motor 105. Additionally, the sensors 110 can be electrically coupled to inverter feedback circuitry 130. The inverter feedback circuitry 130 can be electrically coupled to the control circuitry 125. The control circuitry 125 can be electrically coupled to the gate drivers 120 and to the motor control circuitry 185. The gate drivers 120 can be electrically coupled to the gates of transistors 116. The PWM timers 135, sample timers 165, data port 145, and digital signal processor 150 can be electrically connected to one another such as via a common bus.

The ADC 155 can be electrically coupled to the digital signal processor 150 and the inverter feedback circuitry 130. During operation, the transistors 116 may receive DC power from the DC supply bus, and provide AC power to the motor 105. The control circuitry 125 can provide one or more control signals to the gate drivers 120 and the gate drivers 120 can energize the gates of transistors 116 such as to provide a sequence of electrical pulses to the windings of the motor 105 such as to cause the rotor of motor 105 to turn. The sensors 110 can sense a current or voltage associated with the motor windings, and provide the sensed signal to inverter feedback circuitry 130. The inverter feedback circuitry 130 can provide the sensed signal to the ADC 155. The ADC 155 can convert the sensed signal into digital samples.

In an example, the ADC 155 can be an isolated successive-approximation register (SAR) ADC. The SAR ADC converts a continuous analog waveform into a discrete digital representation using a binary search algorithm through all possible quantization levels before finally converging upon a digital output for each conversion. The isolated SAR ADC may include a frame grabber circuit 156 configured to extract a waveform of the sensed signal (e.g., a winding current or drive voltage) during a PWM frame with a duration of PWM period. The grabbing of the sensed signal can include oversampling the sensed signal in the PWM period at a sampling rate higher than the PWM frequency, such that more than one samples of the sensed signal can be extracted from a PWM frame. By way of example and not limitation, the frame grabber circuit 156 may sample the sensed signal at a rate 50 times the rate of the PWM frequency.

The ADC 155 may include a cycle average 157 configured to calculate an average of the samples of the sensed signal within a PWM frame. For example, an average winding current may be calculated using all the current samples captured in an entire PWM frame. As the winding current can be highly nonlinear over time within a PWM frame, oversampling the winding current at a higher rate (e.g., above the PWM rate) can help preserve more information, such as high-frequency components, of the sensed winding current. The average of the oversampled current samples is sensitive to the whole PWM period, and does not depend on current symmetry within a PWM frame. The average current thus computed preserves information from the excitation of the system by the PWM, and is sensitive to the whole PWM period; therefore, it can be more representative of the true average than conventional techniques such as mid-point sample. The oversampling and averaging at the SAR ADC may also decrease dead time delay (DTD) effect, thereby reducing motor parameter estimation errors. Additionally, if the PWM frame information is kept away from the application processor for handling real-time motor control applications, the averaging operation of the oversampled signal samples can also reduce the bandwidth requirement. Examples of the frame grabbing and oversampling of winding current are discussed in the following, such as with reference to FIG. 7.

The digital signal processor 150 may receive the digital samples and may apply a digital filter to the digitized sensed signal. For example, the digital signal processor 150 may apply a least squares fit to the received signal. The sample timers 165 may generate timing signals for the PWM timers 135, the data port 145, the ADC 155, and the digital signal processor 150. The sample timers 165 can make use of PWM timing information such as to avoid noise generated by switching of transistors 116. The motor control circuitry 185 can provide high-level control algorithms to the control circuitry 125 such as via the data port 145.

The digital signal processor 150 may include a parametric model 158, which can be generated offline and/or by an external device or processor. The digital signal processor 150 can simulate the sensed signal using the parametric model 158. In an example, the parametric model is a mathematical model including one or more model parameters. The digital signal processor 150 may update at least one model parameter until the simulated sensed signal (e.g., a simulated winding current) satisfies a specific condition relative to the sensed signal measured from the motor (e.g., winding current sensed by the sensor 110). An optimal motor parameter may be determined from the model with the updated model parameter.

In various examples, using the parameter model 158 to simulate the sensed signal may include a parametric fitting of a waveform of the sensed signal, such as in an entire PWM frame. In an example, the fitting can be a linear fitting. In another example, the fitting can be a non-linear fitting, such as using polynomial, exponential, logarithmic, or power function curve fitting, or a variation thereof such as a piece-wise nonlinear regression model. In an example, the digital signal processor 150 may receive from the frame grabber circuit 156 a first current waveform of the measured winding current during a PWM period, and generate a second current waveform that simulates the winding current during a PWM period. The digital signal processor 150 may compare the first and second current waveforms, and update a model parameter for the parametric model 158 based at least on a similarity metric between the first and second current waveforms. Examples of the similarity may include squared estimation errors accumulated over the samples in the PWM frame, or other morphological similarity metrics.

Various optimization techniques may be used for parametric fitting. In an example, the digital signal processor 150 may update a model parameter until the first current waveform represents a least squares fitting of the second current waveform. In another example, the digital signal processor 150 may update the at least one model parameter using a stochastic gradient descent algorithm to minimize a difference between the first and second current waveforms. Examples of parametric fitting of a winding current in a PWM period are discussed below, such as with reference to FIGS. 8A-8C.

In various examples, simulation of the sensed signal (e.g., via parametric fitting) may be operated offline (i.e., not in real time) in a background thread to save computational resources and bandwidth for real-time applications. Real-time frame grabbing and high-speed ADC may be implemented in the front end and stored in the ADC 155.

Motor parameters may remain unchanged, or change slowly, over time. Accordingly, parametric fitting and motor parameter determination processes may be performed periodically, intermittently, or on a demand basis. In an example, the frame grabber circuit 156 may capture a PWM frame of the sensed signal periodically, intermittently, or responsive to a command. The digital signal processor 150 may accordingly perform parametric fitting of the captured PWM frame following a similar schedule or in a similar time pattern. In another example, the frame grabber circuit 156 may capture PWM frames continuously, and the cycle average 157 may calculate an average of the sensed signal samples for every PWM frame. The digital signal processor 150, however, may access to the captured PWM frames every now and then, such as according to an access schedule or responsive to a command.

The digital signal processor 150 may include a voltage compensator 159 to process a drive voltage signal sensed by the sensors 110, such as to compensate for leakage of voltage value from one PWM frame to a neighboring PWM frame such as introduced by voltage filtering. Examples of digital voltage compensation are discussed below, such as with reference to FIG. 11.

In various examples, at least a portion of the motor control system 100 may be implemented in a sensor node configured to be deployed to a motor. The sensor node may be programmed to monitor motor characteristics when the machine operates in its normal operating condition. The sensor node may include sensors and measurement circuitry to measure the winding current from the motor, among other parameters. The sensor node can generate a control signal, based on motor operating condition, to adjust an operation of the motor.

The sensor node may be communicatively coupled to a computing device via a communication link. Examples of the computing device can include gateways or cloud servers. The sensor node, or a networked plurality of sensor nodes, and the computing device, form a machine health monitoring system. The computing device can receive from the sensor node information of the winding current and determine model parameter using the measured winding current.

One or more locally configured clients or remote clients securely connected to the computing device, such as cloud over Internet connection.

The sensors and/or the computing devices may detect or predict motor faults or failures. In an example, a cloud server may include hardware and software configured to execute a broad suite of algorithms for monitoring and condition-based maintenance (CBM) of a machine, such as a motor. Examples of the motor faults or failures may include winding failures such as shorts from insulation failure/contamination or loose wedges, rotor bar breakages, misalignment, or temperature changes, physical change such as stator damage, among other anomalies.

The client devices may generate an alert notification to alert a user of the detected incipient fault, the diagnosed fault type, and/or how long before the fault may cause machine failure. The alert notification may be sent via email, text or "Instant" messaging such as short message service (SMS), Web page update, phone or pager call, among others. In some examples, alert notification is triggered only when a specific alert condition is satisfied. Upon alert notification, the user may view that status, interpret the results, and take actions such as performing further test, make necessary repairs or other preventive or corrective actions.

Portions of the machine health monitoring system may be implemented using hardware, software, firmware, or combinations thereof. In an example, at least a portion of the machine health monitoring system 100 may be implemented using an application-specific circuit that may be constructed or configured to perform one or more particular functions, or may be implemented using a general-purpose circuit that may be programmed or otherwise configured to perform one or more particular functions. Such a general-purpose circuit may include a microprocessor or a portion thereof, a microcontroller or a portion thereof, or a programmable logic circuit, a memory circuit, a network interface, and various components for interconnecting these components. For example, a "comparator" may include, among other things, an electronic circuit comparator that may be constructed to perform the specific function of a comparison between two signals or the comparator may be implemented as a portion of a general-purpose circuit that may be driven by a code instructing a portion of the general-purpose circuit to perform a comparison between the two signals.

Figures 2, 3:
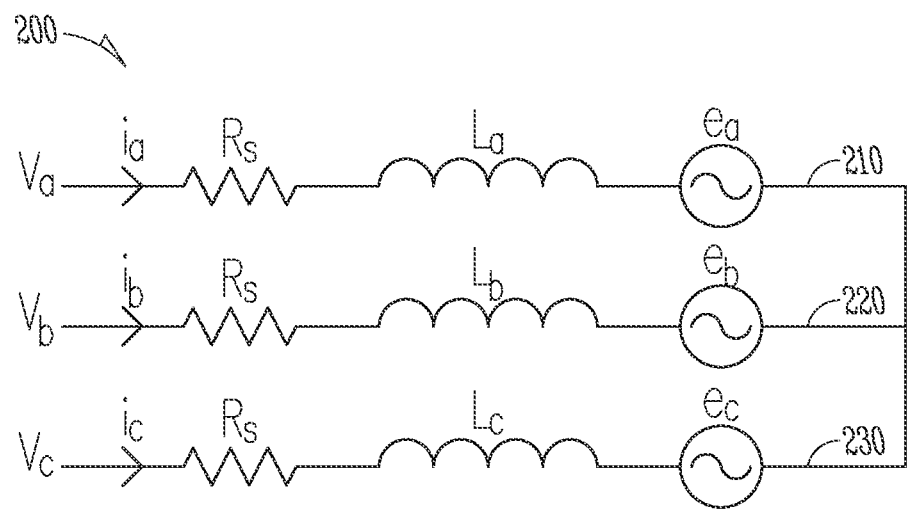
FIG. 2 is a schematic illustrating an example of motor windings of an electric motor.
FIG. 3 illustrates an example of voltage vectors and corresponding applied voltages to the motor windings.

FIG. 2 is a schematic illustrating an example of motor windings of a motor 200. The motor 200 can include any number of windings. In an example, the motor 200 can be a three-phase motor, which can be an embodiment of the motor 105. A three-phase motor is a motor construction that needs three wires with the other sides of the windings being shorted to each other. The three-phase motor can form a star/wye arrangement, such that the windings are oriented 120 degrees apart from each other. As illustrated in FIG. 2, the motor windings 200 may include a first motor winding 210, a second motor winding 220, and a third motor winding 230. The first motor winding may include an inductance $L_a$, a resistance $R_a$, and an electromotive force $e_a$. The second motor winding may include an inductance $L_b$, a resistance $R_a$, and an electromotive force $e_b$. The third motor winding may include an inductance $L_c$, a resistance $R_c$, and an electromotive force $e_c$. The windings deliver power to the motor. The voltage applied to each winding can have a magnitude and a phase angle matching that of the winding's physical orientation. The windings can each be driven by PWM drive to reduce unreasonable amounts of power being dissipated in the drivers due to the large currents. During operation, the PMW timers 135 may provide one or more timing signals to the gate drivers 120. The gate drivers 120 can control the transistors 116 such as to adjust the voltages applied to the motor windings 210, 220, and 230 to cause a current to flow in the motor windings, which in turn, causes the rotor of motor 105 to turn.

A three-phase motor may have several switching states corresponding to various voltage vectors (also referred to as field vectors). FIG. 3 is a table 300 illustrating, by way of example and not limitation, voltage vectors and corresponding applied voltages to the motor windings 200. In this example, a voltage of zero or a voltage $V_{dc}$ may be applied to each of the three motor windings 210, 220, and 230, resulting in eight possible voltage vectors $V_{100}$ through $V_{111}$ as shown in FIG. 3. For example, a voltage vector $V_{100}$ that corresponds to applying a voltage $V_{dc}$ to the first motor winding 210, and applying a voltage of zero to the second motor winding 220 and the third motor winding 230. The stator of the motor can generate a field as a combination of different winding directions and winding drive voltages. When the windings are formed in a star/wye arrangement, vectors $V_{000}$ and $V_{111}$ both result in a zero field output. The remaining six voltage vectors ($V_{100}$, $V_{101}$, $V_{001}$, $V_{011}$, $V_{010}$, and $V_{110}$) each result in a non-zero field to drive the rotor motion.

Figure 4A:
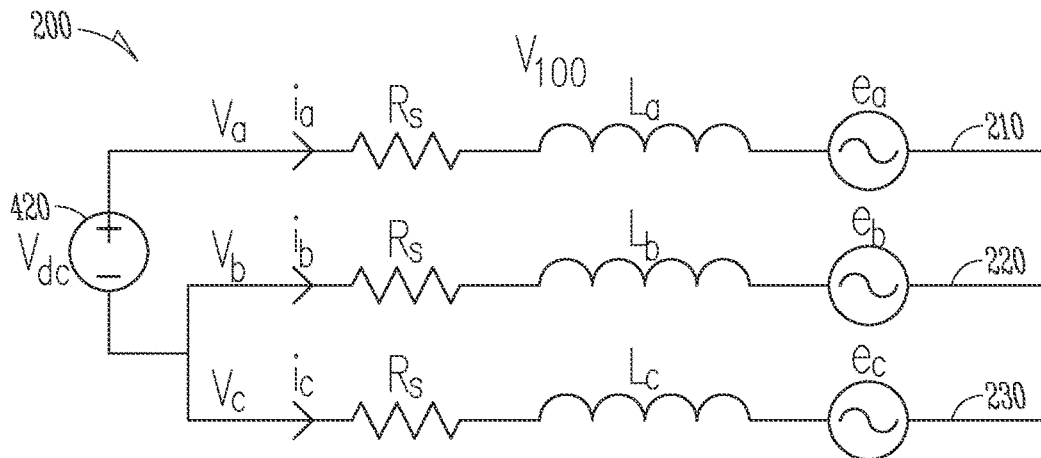
FIGS. 4A-4C are schematics illustrating examples of voltage vectors using a voltage source $V_{dc}$.
Figure 4B:
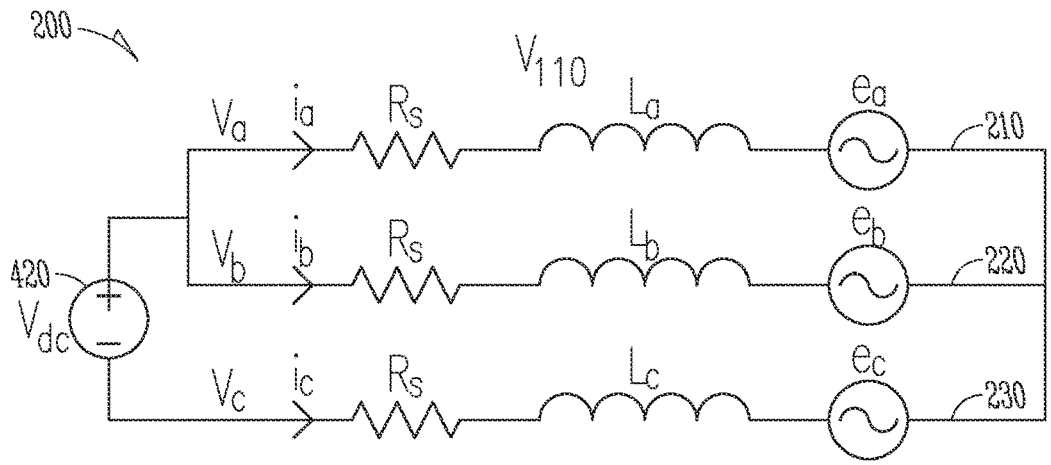
Figure 4C:
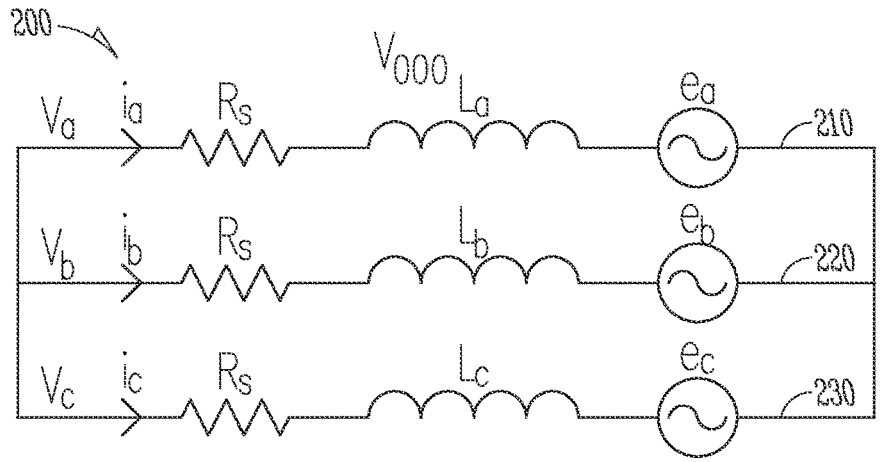

FIGS. 4A-4C are schematics illustrating examples of voltage vectors as illustrated in FIG. 3 using a voltage source $V_{dc}$. FIG. 4A shows an example of a voltage vector $V_{100}$ being applied to the motor windings 200, where a voltage $V_{dc}$ is applied to the first motor winding 210, and a voltage of zero volts is applied to the second motor winding 220 and the third motor winding 230. FIG. 4B shows an example of a voltage vector $V_{110}$ being applied to the motor windings 200, where a voltage $V_{dc}$ is applied to the first motor winding 210 and the second motor winding 220, and a voltage of zero volts is applied to the third motor winding 230. FIG. 4C shows an example of a voltage vector $V_{000}$ being applied to the motor windings 200, where a voltage of zero volts is applied to the first motor winding 210, the second motor winding 220, and the third motor winding 230.

Figure 5:
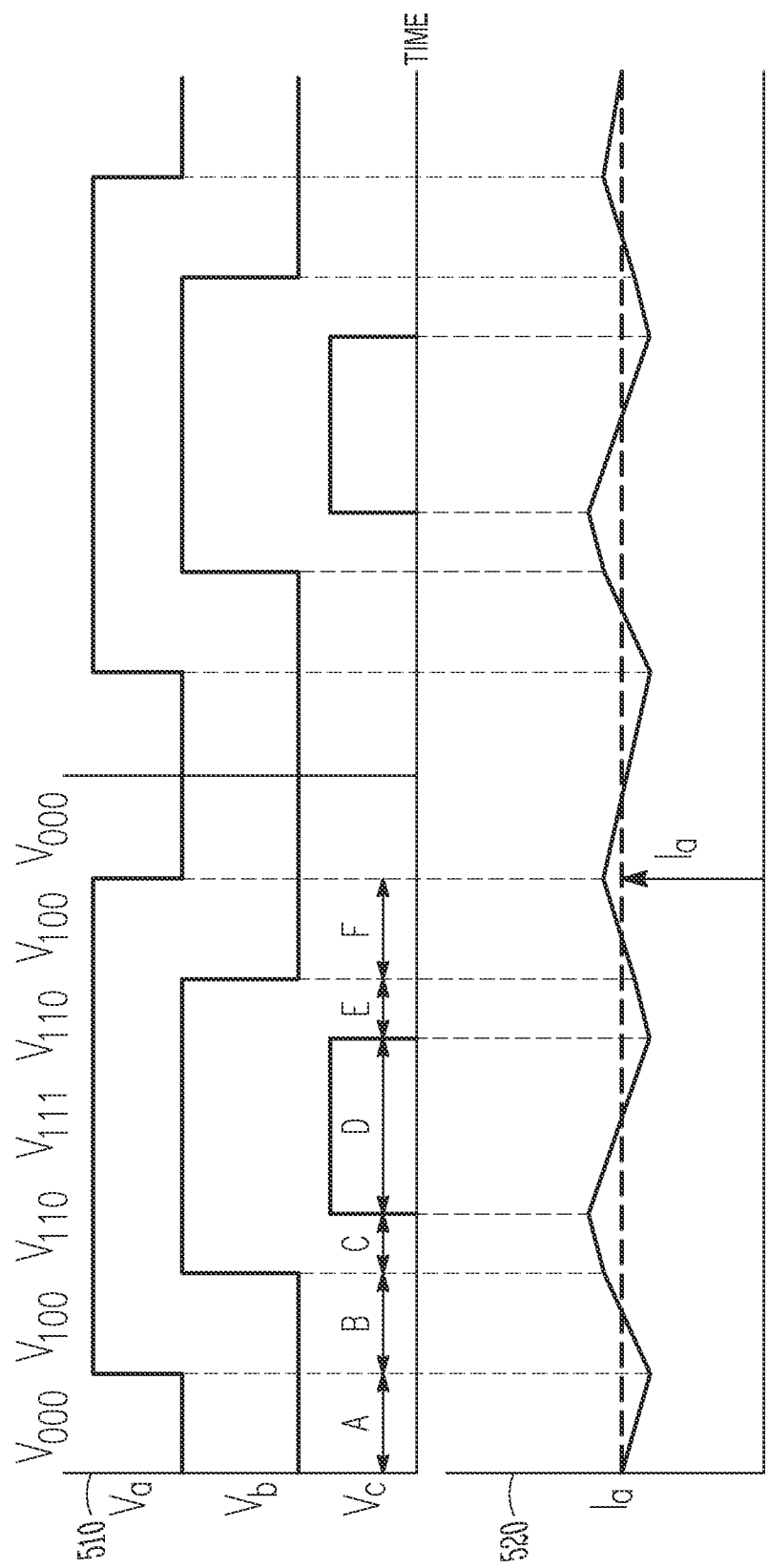
FIG. 5 is a diagram illustrating an example of a sequence of voltage vectors being applied to the motor windings to cause the rotor of motor to turn.

FIG. 5 is a diagram illustrating an example of a sequence of voltage vectors being applied to the motor windings 200 to cause the rotor of motor 105 to turn. The upper portion of FIG. 5 is a timing diagram 510 illustrating switching of voltage vectors applied to the motor windings 200. The lower portion of FIG. 5 illustrates current responses 520 in the first motor winding 210 over time in response to the applied voltage vectors. In this example, six temporally consecutive regions A through F are identified, each associated with a voltage vector from those shown in FIG. 3. In region A, a voltage vector $V_{000}$ is applied to the motor windings (i.e., zero volts applied to all three windings 210, 220, and 230). In each of regions B and F, a voltage vector $V_{100}$ is applied to the motor windings (i.e., a voltage $V_{dc}$ applied to the first motor winding 210, zero volts applied to each of second and third motor windings 220 and 230). In each of regions C and E, a voltage vector $V_{110}$ is applied to the motor windings (i.e., a voltage $V_{dc}$ applied to the first motor winding 210, a voltage $V_{dc}$ to the second motor winding 220, and a zero volt to the third motor winding 230). In region D, the voltage vector $V_{111}$ is applied to the motor windings (i.e., a voltage $V_{dc}$ applied to each of all three motor windings 210, 220, and 230). Current responses 520 may be determined based on the corresponding voltage vectors applied at different regions.

Figure 6A:
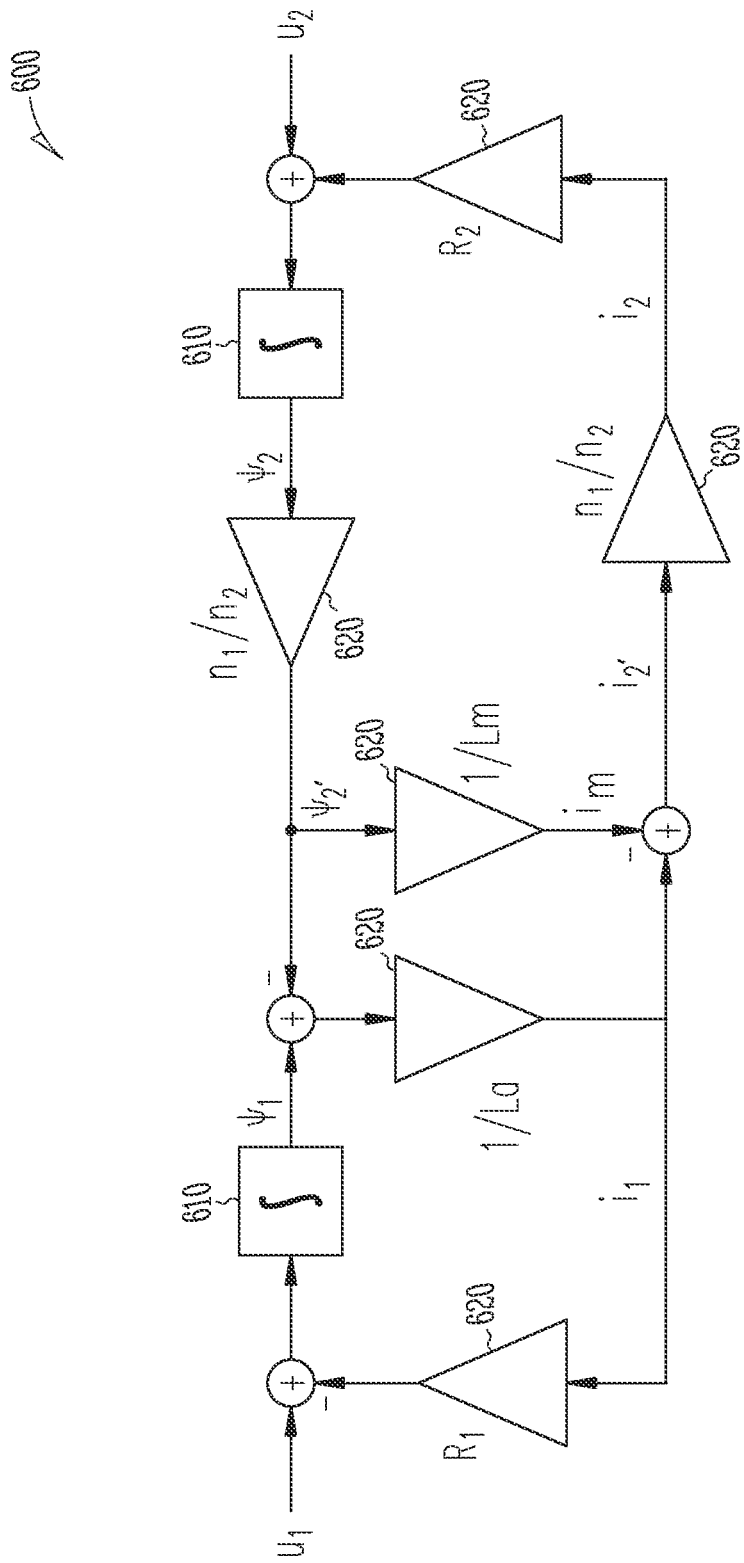
FIG. 6A is a diagram illustrating an example of a transformer model 600 that can be used for estimate motor parameters.

FIG. 6A is a diagram illustrating an example of a motor model 600 that can be used for estimate motor parameters. A motor can be represented by a rotational transformer, such that for each winding orientation there is a time varying coupling. The motor model 600 is therefore may also be used to model a transformer. The model 600 includes one or more integral operators 610 and one or more gain operators 620. The integral operators 610 may correspond to Faraday's law that relates the rate of change of magnetic flux through a loop to the magnitude of the electro-motive force, or voltage across a load, that is induced in the loop. The gain operators 620 may be represent various motor parameters, such as magnetizing inductance $L_m$, leakage inductance $L\sigma$, resistances $R_1$ and $R_2$, and winding ratio $n_1/n_2$ of the transformer equivalent, among others. The primary drive voltage ($u_1$) applied to the model 600 can have a fixed amplitude, and the resulting current ($i_1$) can be calculated. The secondary voltage ($u_2$) can be inferred from the model if the parameters value are known. Various motor parameters may be estimated and characterized using the drive voltage and/or the current.

In some examples, the model 600 may be used to estimate a rotor angle of the motor. Rotor angle refers to a position of the rotor relative to the stator, and indicates an operational state of the motor. The relative angle between these two time-varying quantities has a direct relation to the torque output of a motor. The rotor can be combined with a position-detecting sensor for detecting the position of the rotor. When the position of the rotor is combined with terminal voltage and current, torque can be evaluated and a drive voltage that can produce the peak torque can be identified. However, using the position-detecting sensor increases the cost of the motor itself, as well as the cost of a motor control apparatus because of the position-detecting sensor itself, wires for delivering an output signal from the position-detecting sensor, and a receiving circuit in a motor control apparatus for receiving such an output signal. Possible failures in these additional hardware may reduce the accuracy of position detection. Alternatively, rotor angle may be detected in a sensorless fashion without the need for a position sensor. By making the time varying coupling a hidden input and having the drive voltage $u_1$ at a fixed amplitude, time-varying electrical coupling may be characterized. Because said coupling is affected by the rotor angle, reliable and accurate extraction and characterization of motor parameters (e.g., time-varying behavior and nonlinearity of a motor parameter such as magnetizing induction) can be important to precisely estimate the rotor angle in a sensorless fashion.

Figure 6B:
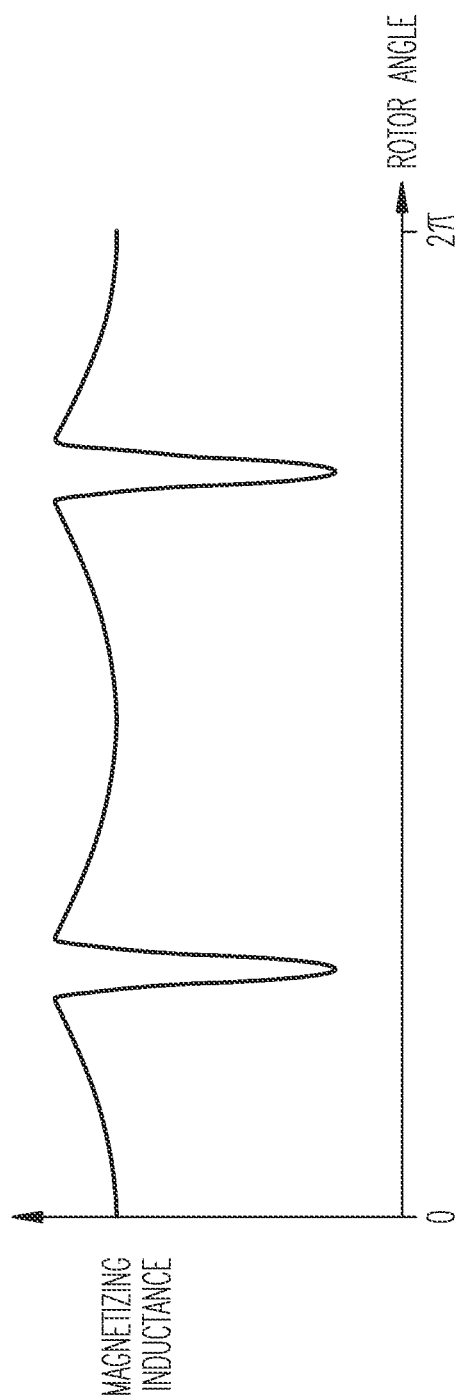
FIG. 6B is a graph illustrating an example of magnetizing inductance that changes with rotor angle during a full PWM switching cycle

Conventionally, some systems assume a constant rotor angle value independent for motor parameters. Some other systems infer a rotor angle from one or more motor parameters using a simple linear model or using a linear fitting method. However, the motor parameters are generally highly time varying during the operation of a motor. The motor parameters may also vary with rotor angle. Simple linear model therefore may not provide an accurate characterization of time-varying model parameter. FIG. 6B is a graph illustrating an example of magnetizing inductance ($L_m$) (shown in the vertical axis) that varies with rotor angle (shown in the horizontal axis) that varies from 0 to $2\pi$ radians. In low-power motors, magnets can be glued to a rotor, which causes the spacing of the gap between the rotor and the stator to vary over time. As the reluctance of air is much higher than that of the stator and rotor, large variations in the air gap may dominate the mapping between voltage and current, which is referred to as the magnetizing inductance $L_m$. The substantial variation in the magnitude of $L_m$ corresponds to substantial changes of rotor angle over time. Therefore, a simple approximation of the rotor angle with a single number may not provide an accurate characterization of the rotor angle. Although the air gap may be better controlled in a higher power motor than in a lower power motor, the torque variations with the estimated rotor position can be significant, unless the bandwidth of the control loop is greatly reduced simply due to the power the motor can produce.

Figure 7:
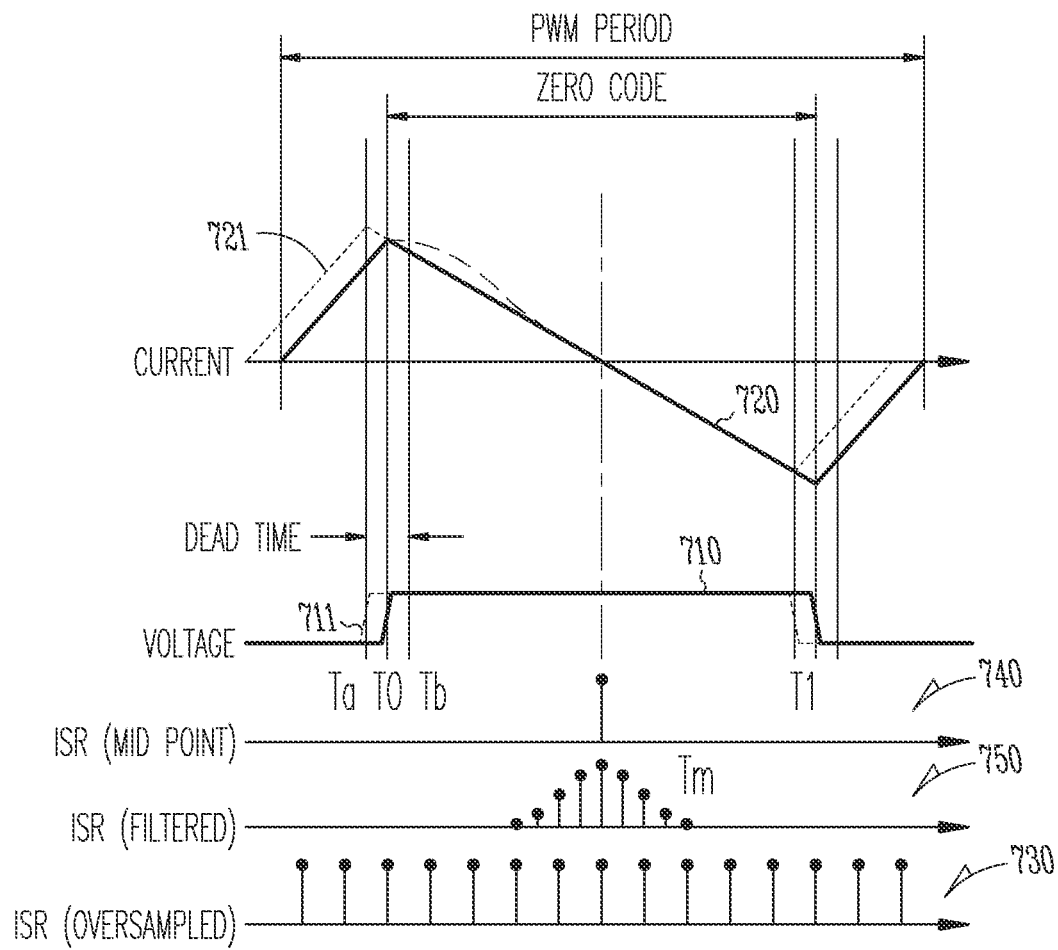
FIG. 7 illustrates a technique of oversampling the winding current within a PWM period.

The present inventor has recognized an unmet need for improved techniques of extracting motor parameters that co-vary with rotor positions, as well as more precise motor control using the motor parameters and rotor position estimates. FIGS. 7 and 8A-8C as discussed below provide, according to various aspects of this disclosure, techniques that can improve the accuracy of motor parameter estimation, including sampling winding current and parametric fitting of winding current waveform such as by using a parametric model FIG. 7 illustrates a technique of oversampling the winding current within a PWM period, according to various embodiments. A high bandwidth excitation signal, such as a PWM voltage signal 710, is applied to the windings to drive the motor. A resulting winding current 720 can be sensed by a sensor such as the sensor 110. During the PWM period, the PWM voltage 710 stays at a high level between $T_0$ and $T_1$, and at a low level at other times. A zero code is defined between $T_0$ and $T_1$. A waveform of the winding current 720 within the PWM period may be captured such as by the frame grabber circuit 156. Graph 730 illustrates a proposed sampling technique, hereinafter referred to as oversampled SAR, that oversamples the winding current 720 at a sampling rate higher than the PWM frequency during the entire PWM period. The oversampled SAR may be implemented in the frame grabber circuit 156. By sampling at a higher rate, more information (e.g., high-frequency components) of the current winding may be preserved in the samples.

For the purpose of comparison, conventional sampling methods are illustrated in FIG. 7. Graph 740 illustrates a mid-point sampler that captures the winding current waveform at a rate of PWM frequency. The mid-point sampler samples only once at around the middle of the zero code $T_m$, in every PWM frame. Graph 750 illustrates a weighted sampler that captures a subset of the winding current temporally at and in a vicinity of $T_m$. The current samples taken at and around $T_m$ are weighted by respective gain factors. An average winding current can be determined using a weighted combination of the current samples respectively weighted by their gain factors. Graph 750 illustrates an example where the gain factor is the largest at $T_m$, and tapers off with time in both directions away from $T_m$. The current samples are effectively weighted by the impulse sensitivity of a mid-point filter.

In an ideal motor system where the winding current waveform is substantially symmetric about $T_m$, the sampling methods 740 and 750 may result in respective current estimate approximately equal to the average of the current over the PWM period. However, in many practical occasions, the winding current waveform may not be substantially symmetric about $T_m$. FIG. 7 illustrates a dead time delay (DTD) effect that may cause the voltage switching edges 711 to shift in time. The DTD can be introduced between the opening of one voltage switch (i.e., energizing one winding) and the closing of another voltage switch (i.e., turning off another winding). Such a transitional state is also referred to as non-overlapping between the switches. The DTD is commonly introduced in order to avoid a state of the two switches being activated together, which would short the power supply and the resulting high current would damage the switches or of the power supply. Also, any slew rate control for electromagnetic emissions can happen within this time window. As both switches are non-conducting during the DTD, the voltage set on the load connection depends on the load condition, and in particular on the load current direction. If the current is positive (i.e., the current flows toward the load), then the voltage will be almost equal to that of the negative pole of the power supply, such as due to the parasitic diode in the low side switch. If the current is negative (i.e., the current flows from the load to the switches), then the voltage will be almost equal to that of the positive pole of the power supply. This may create a non-deterministic relation between PWM duty cycle and voltage applied, and a significant error in voltage output. FIG. 7 illustrates such an uncertainty of voltage output at the voltage transition period (e.g., rising edge from low to high voltage, and falling edge from high to low voltage), as well as uncertainty of voltage transition time between the beginning ($T_a$) and the end ($T_b$) of the non-overlap time.

Another problem created by the DTD is that voltages having a pulse width smaller than the dead time cannot be output. Thus a voltage value close to negative or positive power supply line voltage, which have respectively a small on-time or a small off-time pulse width, cannot be output. This may create discontinuity in the voltage close to the negative or positive voltage output.

The shift of the voltage switching edges 711 also breaks the current symmetry about the middle point at $T_m$. As illustrated in FIG. 7, the current waveform 720 also shift in time to 721, which is no longer symmetric about $T_m$ within a PWM period. Non-linearity in the system may also contribute to the asymmetric winding current. Conventional mid-point sampling 740 or weighted sampling 750 at or in a smaller neighborhood around the expected middle point of zero codes may not provide an accurate estimate of average winding current. In contrast, the presently proposed oversampled SAR 730 is carried out throughout a full PWM frame at a sampling rate higher than PWM frequency, and does not rely on the current waveform being symmetric about $T_m$. As such, the oversampled SAR 730 is more immune to uncertainty in the voltage transition period associated with DTD. The oversampled representation of the winding current may be used to estimate an average winding current, such as using the cycle average 157. By taking all the samples in the PWM period, the average current is sensitive to the whole PWM period, and therefore is more representative of a true average current than the mid-point sample 740 or the weighted sample 750. Based on the average current calculated based on the winding current sampled using the oversampled SAR 730, one or more motor parameters may be more accurately estimated, and the motor operating condition may be more reliably detected.

The portion of the winding current corresponding temporally to the voltage transition period (hereinafter the "edge current") can change dramatically over a short period of time. In some examples, the average current during a PWM frame can be computed over a subset of the current samples excluding the samples of the edge current. In some examples, the edge current may be fit separately to a different parametric model than the model fitting the rest portions of the current in a PWM frame. In an example, the frame grabber 156 may oversample edge current at a sampling rate different from the sampling rate for oversampling the rest portions of the current in a PWM frame. Parametric fitting of the samples of the edge current may be performed separately from the parametric fitting of the samples of the rest of the current waveform in a PWM frame. Alternatively, timing of the voltage transition period may be identified, and the current edge may be extracted in a different channel and put in as a known input to the parametric model.

Figure 8A:
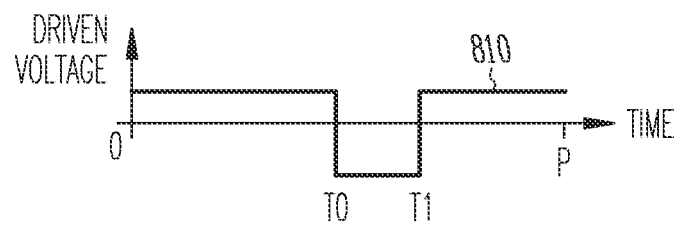
FIGS. 8A-8C are graphs illustrating parametric fitting of a current waveform or motor parameter values during a PWM period.
Figure 8B:
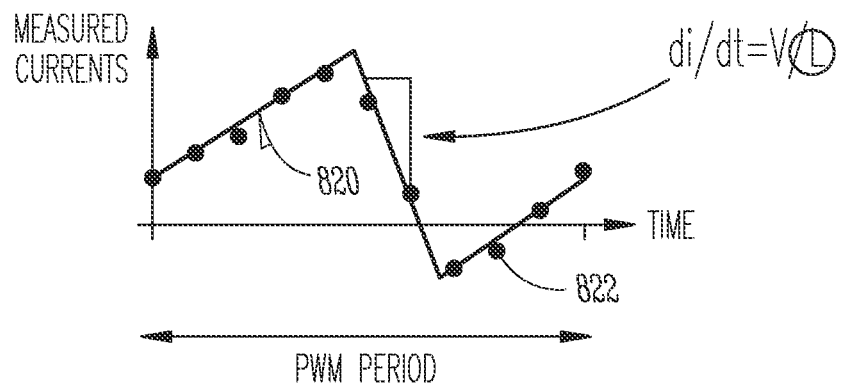
Figure 8C:
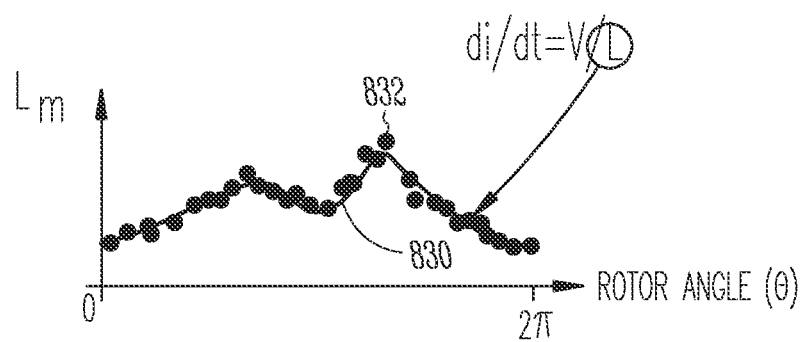

The oversampled version of the winding current, such as generated by using the oversampled SAR 730 as discussed above, may be fit to a motor model. By capturing the current waveform at a rate substantially higher than the PWM frequency (e.g., 10-50 times as high as the PMW frequency), different motor parameters may be tested, and an optimal parameter set can be identified that gives a simulated waveform that is like the measured current waveform according to a specific similarity criterion. FIGS. 8A-8C are graphs illustrating, by way of example and not limitation, parametric fitting of a current waveform or motor parameter values during a PWM period. FIG. 8A illustrates a PWM voltage signal 810 that drives the motor. The PWM voltage 810 has a low level between $T_0$ and $T_1$, and a high level at other times. The resulting winding current can be sampled using the oversampling process 630. The current samples 822, as illustrated in FIG. 8B, may be simulated using a parameter model. In an example, one or more model parameters may be updated until the simulated current obtained from the model satisfies a specific condition relative to the current samples 822.

In an example, the parametric model can include parametric fitting of the current samples 822 in the entire PWM period to a curve. The fitting can be a linear fitting, or a non-linear fitting such as using polynomial, exponential, logarithmic, or power function curve fitting, or a variation thereof such as a piece-wise nonlinear regression model. FIG. 8B illustrates a linear fitting of the current samples 822 to a current curve 820 such as using a least squares fitting algorithm. The fitted current curve 820 has model parameters that are related to the parameters of the motor. By fitting the current samples 822, motor parameters may be more reliably and accurately estimated from one or more model parameters that describe the current curve 820. For example, a magnetizing inductance $L_m$ may be derived using a slope of the fitted current curve 820 (di/dt), according to an Equation $L=-V_L/(di/dt)$.

The winding current samples shown in FIG. 8B are taken at a corresponding rotor angle. By varying the rotor angle ($\theta$, between zero and $2\pi$), different winding currents may be measured and corresponding $L_m$ calculated. The resulting multiple $L_m$ values 832 thus each correspond to a particular rotor angle. The rotor angle may be directly measured using a sensor, such as an encoder. Alternatively, the rotor angle may be estimated using a sensorless approach, such as indirectly derived from the winding current and other motor parameters.

FIG. 8C illustrates a graph of multiple discrete $L_m$ values 832 corresponding to different rotor angles. The covariability between $L_m$ values 832 and the rotor angles may be modelled using a parametric model, such as by fitting the $L_m$ values to an $L_m$-$\theta$ curve 830. The parametric fitting of $L_m$ values 832 can be achieved using a similar technique to the parametric fitting of the winding current curve 820 as shown in FIG. 8B. In an example, the parametric fitting includes a nonlinear least squares fitting algorithm. The optimally fitted $L_m$-$\theta$ curve 830 may be described by a set of model parameters such as terms in a curve fitting model such as a polynomial series or Fourier series, among others.

The model parameters describe how $L_m$ varies with rotor angle $\theta$. The parametrically fitted $L_m$-$\theta$ curve 830 may be used to estimate rotor angle for any $L_m$ value, or to determine $L_m$ at any particular rotor angle, in a sensorless system that does not use a sensor or an encoder for direct rotor angle measurement. For example, the optimally fitted $L_m$-θ curve 830 may be used together with the parameterized motor model 600 as shown in FIG. 6A to get an instantaneous estimate of rotor angle. In some examples, the rotor angle may be estimated recursively, such as by updating a previously estimated rotor angle with a predicted additional angle obtained from the $L_m$-θ curve 830. The $L_m$-θ curve 830 may additionally or alternatively be used to indicate motor operating condition, or to detect a motor fault or failure. In an example, the $L_m$-θ curve 830 may be represented by a lookup table, an association map, or other suitable data structure stored in a storage device.

Figure 9:
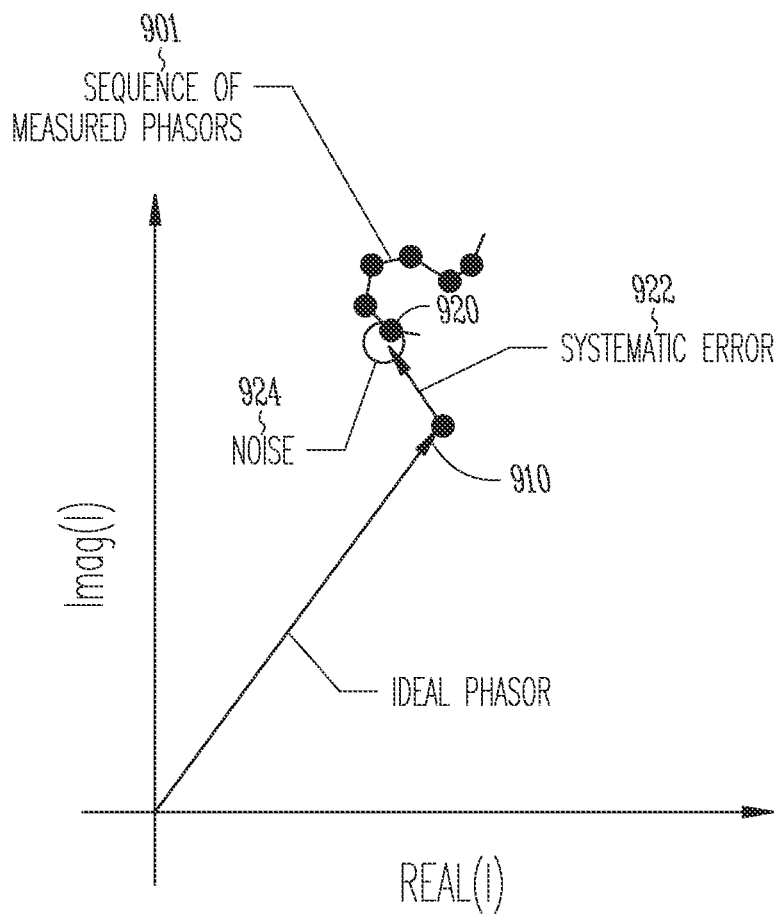
FIG. 9 illustrates an example of a current phasor diagram and measurement errors associated with conventional current measurement techniques, and improvement achieved by the present techniques.

FIG. 9 illustrates an example of a current phasor diagram 900 and measurement errors associated with conventional current measurement techniques, and improvement achieved using various techniques discussed in this document, such as the oversampled SAR in the full PWM period and the averaging of the current samples as illustrated in FIG. 7, and the parametric fitting of current as illustrated in FIGS. 8A-8C. Winding current measurement can be represented by a current phasor (or phase vector) in a complex plane (spanned by real axis (horizontal axis) and imaginary axis (vertical axis). As the winding current changes over time, the current phasor can be continuously evaluated and spins around a portion of the complex plane as a function of time. FIG. 9 illustrates a sequence of measured phasors 901 at different times. An ideal phasor 910 corresponds to an ideal situation where the motor parameters are presumably constant over time and substantially invariant with respect to rotor angle. From the ideal phasor 910, an ideal rotor angle can be extracted. Practically, the winding current, and hence the current phasor, varies with time and rotor angle. When using conventional techniques to measure and process the winding current (such as the mid-sampling 740 or the weighted sampling 750 as discussed above with reference to FIG. 7), one or more of a systematic error or a random error may be introduced. The systematic error may be caused by variation of motor parameters with angle. As a result of the systematic error 922, the actual current phasor at a particular time, such as the phasor 920, may substantially deviate from the ideal phasor 910, represented graphically as a systematic offset 922. The random error may be caused by noise introduced by DTD effect as discussed above. The random error may cause uncertainty of phasor 920 over multiple winding current measurements taken during multiple passes of mechanical revolutions when the rotor is at substantially the same rotor angle. The uncertainty of phasor 920 is represented graphically by a phasor position variability zone 924. At different passes when the rotor is at substantially the same rotor angle, the phasor 920 may fall in anywhere in the variability zone 924. The high variability of current phasor position may reduce the accuracy of estimated motor parameters, such as an estimate of rotor angle.

The oversampled SAR and parametric fitting, among other aspects according to various embodiments as discussed in this document, can reduce systematic and random errors found in conventional motor parameter extraction techniques, thereby improving the performance of estimating rotor angles as well as other motor parameters at different time. For example, the parametric current fitting as described above with reference to FIG. 8 can reduce the systematic error. Additionally or alternatively, the oversampled SAR 730 and averaging of the samples as described above with reference to FIG. 7 can reduce the random errors (e.g., due to uncertainty of voltage transitions in association with DTD).

Figure 10:
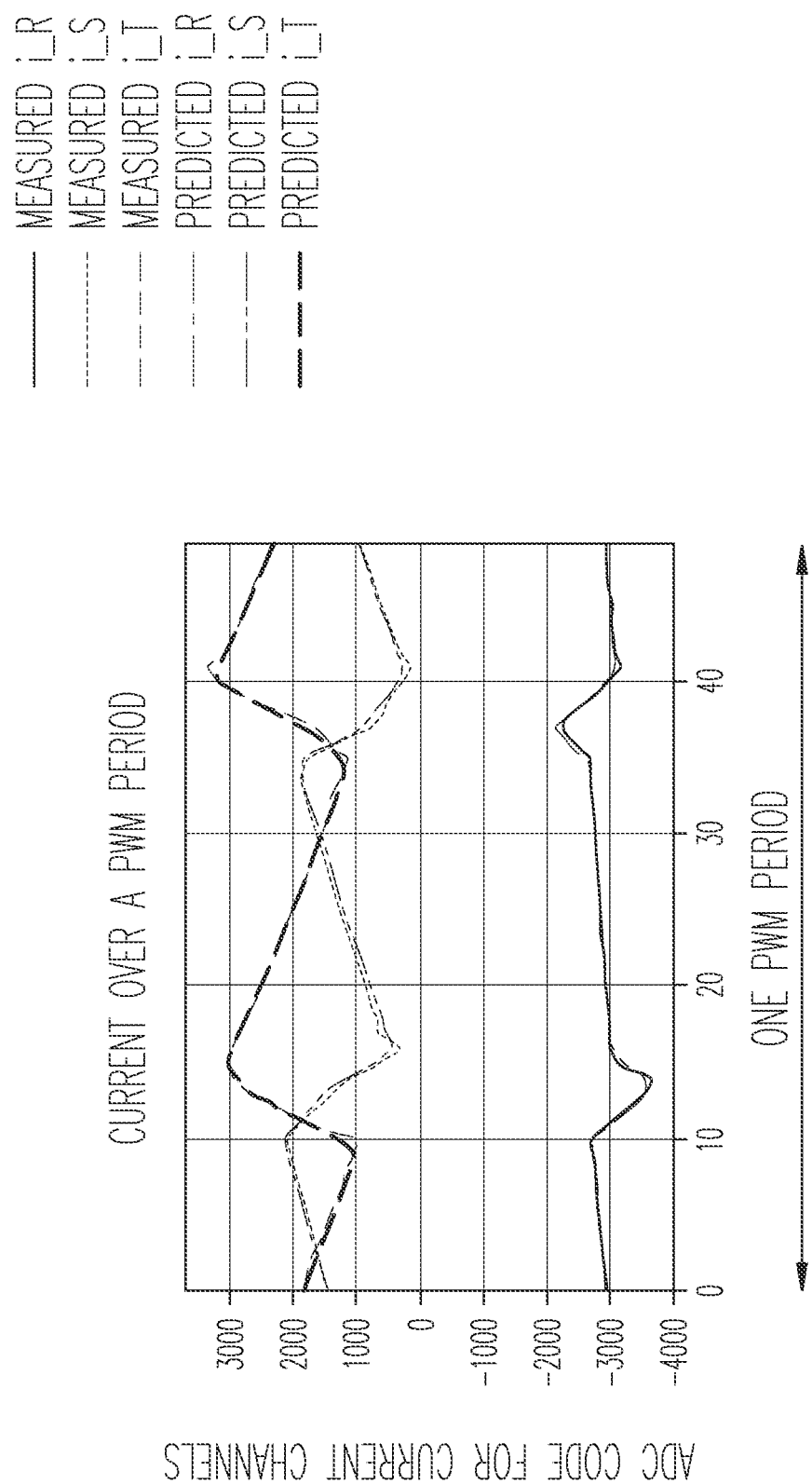
FIG. 10 is a diagram illustrating measured winding currents and the simulated winding current generated using a parametric model.

FIG. 10 is a diagram illustrating measured winding currents and the simulated winding current such as by using the parametric model 158. The winding currents were respectively measured from three coils (R, S, T) of a three-phase motor during one PWM frame, in response to a PWM voltage drive. Also shown in FIG. 10 are simulated winding currents generated using the oversampled SAR 730 and the parametric fitting. The results in FIG. 10 show that the fitted currents match the respective measured currents sensed from the three coils with small fitting errors in the entire PWM period. Motor parameters estimated from the parametric fitting of the winding current can more accurately reflect actual motor parameter values.

The oversampling of winding current in a full PWM frame as discussed above with reference to the frame grabber 156 and the oversampled SAR 730 may also be applied to a voltage channel, such as oversampling a PWM voltage drive in a full PWM frame. In some instances, a motor parameter (e.g., rotor angle) may be estimated using both the applied drive voltage and the winding current, or further using values of other motor parameters at multiple different times during a PWM period. The drive voltage, such as the PWM voltage 710 as shown in FIG. 7, may be discontinuous at the voltage-switching edges (also referred to voltage edges). As discussed above, the DTD and the non-overlap at the voltage edge may cause errors in the estimated rotor angle. A simple method of oversampling the drive voltage in the entire PWM frame may cause a large error because of the uncertainty of the voltage-switching positions between sample edges (e.g., between Ta and Tb as discussed above with reference to FIG. 7). A continuous time integrator at the front end generally requires a large bandwidth to measure the fast voltage-switching edges without errors, in addition to additional operations to correct the gain error that scales with the period. Furthermore, temporal locations of the switching-edge can be unpredictable. Simple window averaging of the digital voltages over multiple PWM periods can introduce inter-period errors at the edges between adjacent PWM periods.

Figure 11:
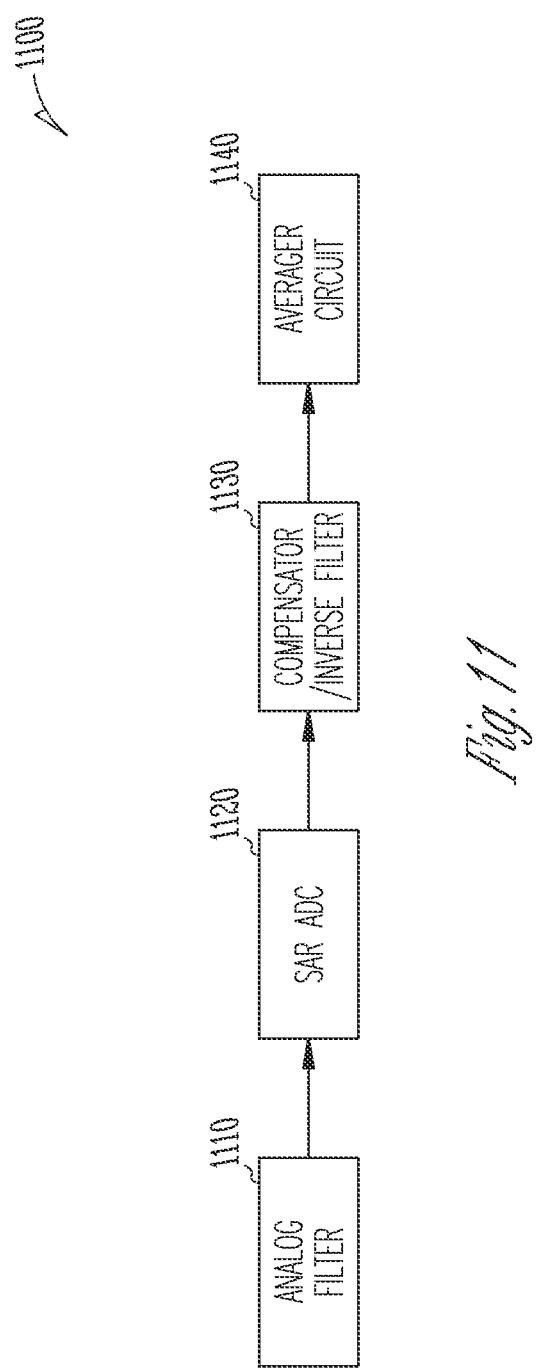
FIG. 11 illustrates a voltage processing circuit for sampling of a PWM voltage to preserve voltage information at the voltage transition edges.

For the reasons above, the present inventors have recognized an unmet need for a technique to sample fast-switching voltages more effectively. FIG. 11 illustrates a voltage processing circuit 1100 for sampling of a PWM voltage to preserve voltage information at the voltage transition edges. In an example, the voltage processing circuit 1100 may be included in the digital signal processor 150. The voltage processing circuit 1100 may include an analog filter 1110, an SAR ADC 1120, a compensator circuit 1130, and an averager circuit 1140. The analog filter 1110 can be a low-pass filter to spread the signal around in time. In an example, the analog filter 1110 is a first-order resistor-capacitor (RC) filter. The RC filter has the benefit of being linear to high bandwidths. The SAR ADC 1120 can oversample the filtered voltage signal at a sampling rate higher than the PWM rate in an entire PWM period. In an example, the SAR ADC 1120 may follow an oversampling approach similar to the oversampled SAR 730 for sampling the winding current as illustrated in FIG. 7.

The compensator circuit 1130 may include a digital filter to inverse-filter the voltage samples. The inverse filter can have a transfer function representing a discrete-time realization of a reciprocal of a transfer function of the analog filter 1110. The inverse filter can compensate for inter-period errors at voltage-switching edges such as introduced by signal filtering, un-spread the converted digital voltage samples to stop energy from leaking between PWM frames, thereby keeping the signal energy within the present PWM frame.

The inverse filter may have a gaining effect on higher frequencies. The averager circuit 1140 may compute an average of the digital samples out of the inverse filter. Averaging operation has a low-pass effect and can attenuate the high-frequency noise introduced by inverse filtering. Because the voltage processing preserves and takes voltage values from the entire PWM period including the fast-switching period, the resultant average voltage from the averager 1140 is a representation of an actual average the full continuous voltage within a PWM period, rather than the average of moments in time in a subset of the PWM period which would have given a poor representation of the actual average voltage. In some cases, the average voltage from the averager 1140 can produce an average voltage estimation to an accuracy orders of magnitude greater than simple sampling.

The improved performance of voltage sampling provided by the voltage processing circuit 1100 can be advantageously achieved with low cost. The analog filter 1110 can be implemented using a first order RC filter, as a result, the digital inverse filter of the compensator circuit 1130 can also be first order, and can be done with a single multiply-add operation.

Figure 12:
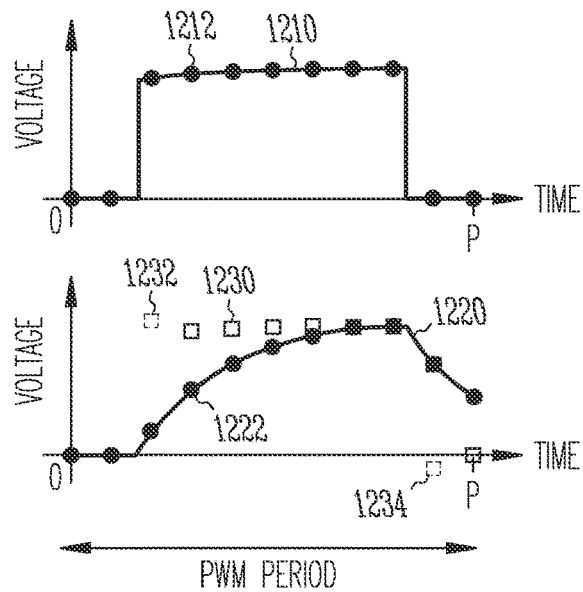
FIG. 12 are diagrams of a PWM voltage waveform in one PWM period before and after oversampling and voltage compensation according to various embodiments of the present document.

FIG. 12 are diagrams of a PWM voltage waveform 1210 in one PWM period before and after oversampling and compensation by the voltage processing circuit 1100 according to various embodiments of the present document. In the upper panel of FIG. 12, voltage samples 1212 obtained from a conventional direct sampling of the PWM voltage waveform 1210 are shown for the purpose of comparison. Because of fast voltage switching and limited sampling rate of the direct sampling (e.g., the sampling rate is below the voltage switching bandwidth), the rising edge and falling edge of the PWM voltage waveform 1210 cannot be properly sampled, the information of the voltage transition may therefore get lost by sampling and cannot be properly recovered.

PWM voltage waveform 1210 may be filtered before sampling. However, heavy filtering will cause energy to be spread in time to such an extent that measurements from the following PWM period will have interference from the current PWM period.

The lower panel of FIG. 12 illustrates improved oversampling of the voltage waveform using the voltage processing circuit 1100, according to various embodiments discussed in this document. The PWM voltage waveform 1210 may first be filtered through a first-order RC filter, an embodiment of the analog filter 1110. The filtered analog signal 1220 has an exponentially rising and falling waveform that includes ramp-up and ramp-down portions each having a RC time constant. The ramp-up and ramp-down portions correspond to charging and discharging of the capacitor of the RC filter driven by the rising edge and falling edge of the PWM voltage waveform 1210. Then SAR ADC 1120 can oversample the filtered analog signal 1220, producing voltage samples 1222 across the PWM period. If the voltage-switching positions were to move around due to the uncertainty as discussed above with reference to FIG. 7, the voltage samples 1222 would change accordingly, whereas in the upper panel, the conventional sampling method would show no change in sampled voltage with switching edge. The voltage samples 1222 can then be inverse-filtered using an inverse filter that has a transfer function that represents a discrete-time realization of a reciprocal of a transfer function of the analog filter 1110. The results are shown as inverse-filtered voltage samples 1230. Voltage samples temporally corresponding to the voltage transitions, including sample 1232 corresponding to the rising edge and sample 1234 corresponding to the falling edge of the PWM voltage waveform 1210, can be affected by the inverse filtering operation. The rest of the inverse-filtered voltage samples 1230, however, are not significantly affected in the sample position as the unfiltered case. Compared to the voltage samples 1210 produced by conventional sampling, the voltage samples 1230 effectively preserve the information at the voltage-switching edges. Additionally, because there is virtually no shift in time in the inverse-filtered voltage samples 1230 compared to the original PWM voltage waveform 1210, window average operation may be performed on the voltage samples 1230 without introducing any inter-PWM period errors.

Figure 13:
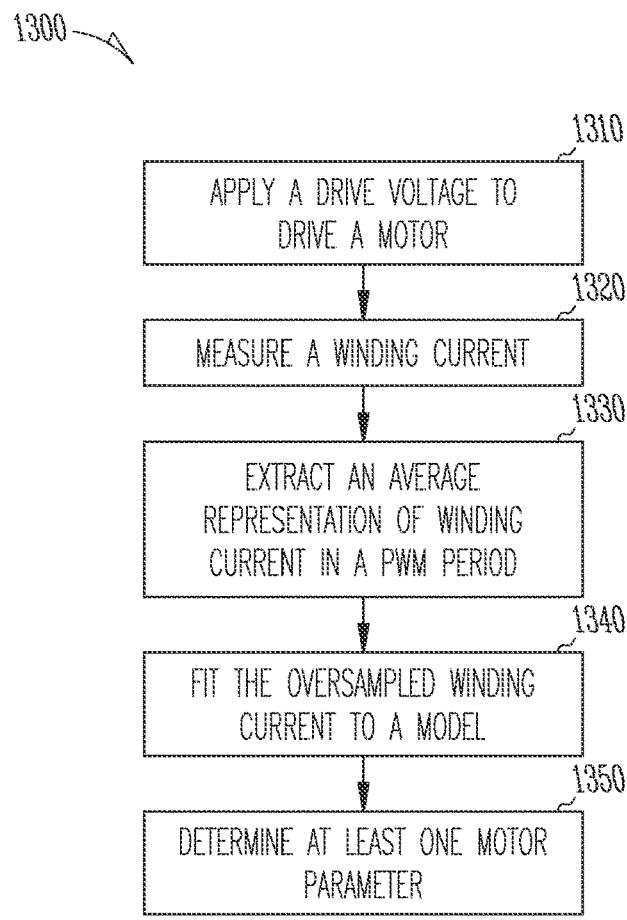
FIG. 13 is a flowchart illustrating an example of a method of extracting motor parameter from an electric motor for monitoring an operating condition of the motor.

FIG. 13 is a flowchart illustrating an example of a method 1300 of extracting one or more motor parameters from an electric motor for monitoring an operating condition of the motor. The method 1300 may be implemented in and executed by a motor monitoring and control system, such as the machine health monitoring system 100 as discussed above.

The method 1300 commences at 1310, where a drive voltage is applied to the electric motor. In an example, the drive voltage can be a high bandwidth voltage, such as a pulse-width modulation (PWM) voltage signal 710 as illustrated in FIG. 7. The PWM voltage is associated with a PWM period and a PWM frequency. The drive voltage can include a voltage-switching edge representing a transition from one voltage level to another different voltage level. A winding current responsive to the applied drive voltage is sensed at 1320.

At 1330, a PWM frame of the winding current can be extracted such as using the grabber circuit 156 in an isolated SAR ADC, and an average representation of the winding current in an entire PWM period can be generated. The extraction may include oversampling the winding current at a sampling rate higher than the PWM frequency during the entire PWM period, such that multiple current samples can be produced in a full PWM frame, such as using the frame grabber circuit 156. The oversampling of the winding current, such as the oversampled SAR 730 illustrated in FIG. 7, does not rely on the assumption of current waveform being symmetric about the middle point of a PWM frame. Accordingly, it can be more immune to uncertainty in the voltage transition period associated with DTD and the system non-linearity. It is therefore more advantageous than conventional mid-point sampling or weighted sampling of a subset of the PWM frame in a vicinity of the mid-point.

The oversampled winding current produced at 1330 may be used to estimate an average winding current, such as using the cycle average 157. Because the average current is computed using samples taken from an entire PWM period, the average current is sensitive to the whole PWM period, and therefore is more representative of the true average current.

At 1340, the oversampled winding current produced at 1330 may be fit to a parametric model. In an example, the parametric model is a mathematical model including one or more model parameters. At least one model parameter may be updated until a simulated winding current obtained from the parametric model satisfies a specific condition relative to the actual winding current values, such as the oversampled winding current. An optimal motor parameter may be determined from the model with the updated model parameter.

In an example, fitting the oversampled winding current to a parametric model may include comparing a first current waveform of the measured winding current during a PWM period and a second current waveform of the simulated winding current during a PWM period, and updating a model parameter for the parametric model based at least on a similarity metric between the first and second current waveforms. Examples of the similarity may include squared estimation errors accumulated over the samples in the PWM frame, or other morphological similarity metrics. In another example, fitting the oversampled winding current to a parametric model may include fitting the oversampled winding current signal in the entire PWM period to a curve. Examples of the fitting may include a linear fitting, a non-linear fitting such as using polynomial, exponential, logarithmic, or power function curve fitting, or a variation thereof such as a piece-wise linear a piece-wise nonlinear regression model. Various optimization techniques may be used for parametric fitting. In an example, at least one model parameter may be updated until the first current waveform represents a least squares fitting of the second current waveform. In another example, optimal model parameters may be determined using a stochastic gradient descent algorithm to minimize a difference between the first and second current waveforms. In some examples, parameters may be directly identified through a mathematical operation.

At 1350, at least one motor parameter may be estimated using one or more of the applied voltage or the winding current. In another example, a motor parameter may be derived from the average current computed using the over-sampled current samples produced at 1330. In an example, a motor parameter may be derived from the simulated winding current generated by the parametric model, as produced at 1340. By optimal fitting of the current samples, motor parameters may be more reliably and accurately estimated FIGS. 8A-8C illustrate an example of estimating magnetizing inductance $L_m$ based on the parametric fit of the winding current The estimated motor parameters may be used to monitor motor operating condition or to detect motor faults of failures. Examples of the motor faults or failures may include winding failures such as shorts from insulation failure/contamination or loose wedges, rotor bar breakages, misalignment, temperature changes, physical change such as stator damage, among other anomalies. In an example, a motor operating condition indication may be generated based on an estimated motor parameter, provided to an operator, or to trigger an alarm or alert.

Figure 14:
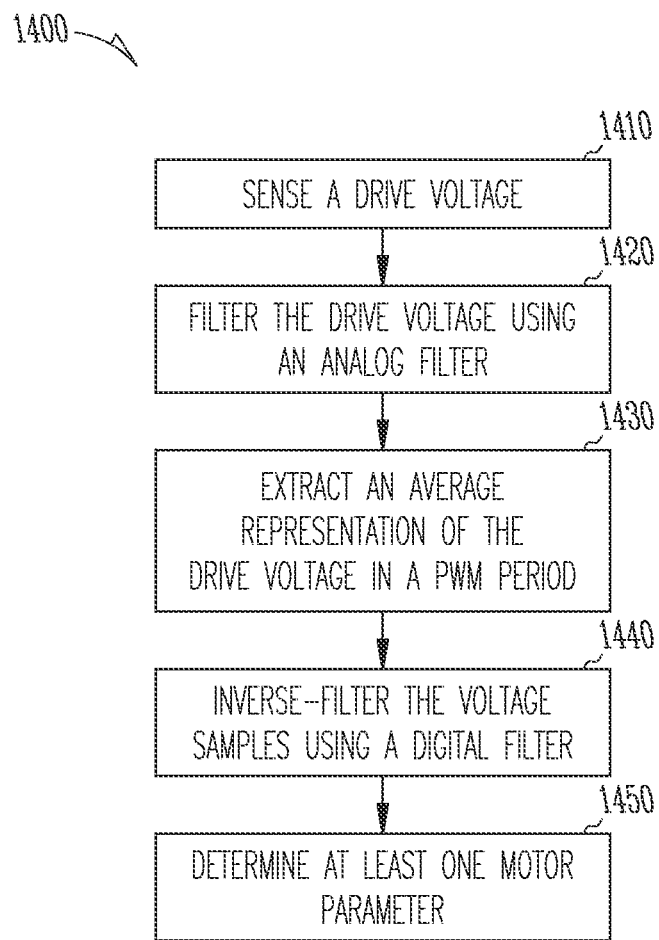
FIG. 14 is a flowchart illustrating an example of a method of sampling a PWM voltage drive while preserving the voltage information at the voltage-switching position.

FIG. 14 is a flowchart illustrating an example of a method 1400 of sampling a PWM voltage drive while preserving the voltage information at the voltage-switching position. The sampled PWM voltage may be used to estimate one or more motor parameters, or an operational state of the motor such as a rotor angle. The method 1400 may be implemented in and executed by the digital signal processor 150 of the machine health monitoring system 100, or a portion thereof, such as the voltage processing circuit 1100.

The method 1400 commences at 1410, where a drive voltage is sensed. In an example, the drive voltage can be a high bandwidth voltage, such as a pulse-width modulation (PWM) voltage signal 710 as illustrated in FIG. 7. The drive voltage can include a voltage-switching edge representing a transition of a voltage level applied to the stator.

At 1420, the drive voltage may be filtered using a low-pass analog filter, such as a first-order resistor-capacitor (RC) filter. The RC filter has the benefit of being linear to very high bandwidth, and can spread the signal energy around in time. At 1430, a PWM frame of the filtered drive voltage can be extracted such as using the grabber circuit 156 in an isolated SAR ADC, and an average representation of the drive voltage in an entire PWM period can be generated. The extraction may include sampling the filtered voltage signal at a sampling rate higher than the PWM rate in an entire PWM period, such as by using the SAR ADC 1120. In an example, the oversampling of the filtered drive voltage at 1430 can be performed using a similar approach to oversampling the winding current at step 1330 of the method 1300.

At 1440, the voltage samples produced at 1430 may be inverse-filtered such as by using the compensator circuit 1130. The inverse filter used at 1440 may have a transfer function representing a discrete-time realization of a reciprocal of a transfer function of the analog filter 1110. The inverse filter can keep the energy within the PWM frame. FIG. 12 illustrates an example of oversampling of a filtered PWM voltage waveform in a PWM period and compensating by inverse filtering, according to the method 1400. Information at the voltage-switching edges is effectively preserved.

The inverse filtering operation at 1440 may introduce gaining effect on higher frequencies. In some examples, the digital samples produced at 1440 may be averaged to attenuate such high-frequency noise, such as by using the averager 1140. Averaging the voltage samples over a PWM frame may be performed without introducing any inter-PWM period errors. As the method 1400 largely preserves the voltage values at the fast-switching period, the resultant average voltage is an improved representation of actual average voltage within a PWM period. This cycle averaged voltage can be used in conjunction with the parameterized motor model such as that shown in FIG. 6A in order to identify the rotor angle.

At 1450, at least one motor parameter may be determined using the inverse-filtered voltage samples. In an example, a rotor angle may be estimated in a sensorless fashion using inverse-filtered voltage samples, the parametric fit of the winding current such as generated using the method 1300, and one or more estimated motor parameters. In some examples, at least one motor parameter may be estimated using an average drive voltage of the inverse-filtered digitized drive voltage in the PWM period. FIG. 8 illustrates an example of a parametrically fitted $L_m$-θ curve 830 representing how $L_m$ varies with rotor angle θ. The parametrically fitted $L_m$-θ curve 830 may be used to estimate rotor angle for any $L_m$ value, or to determine $L_m$ at any particular rotor angle, in a sensorless system that does not use a sensor or an encoder for direct rotor angle measurement. In an example, the optimally fitted $L_m$-θ curve 830 may be used together with the parameterized motor model 600 to get an instantaneous estimate of rotor angle. In some examples, the rotor angle may be estimated recursively, such as by updating a previously estimated rotor angle with a predicted additional angle obtained from the $L_m$-θ curve 830.

Figure 15:
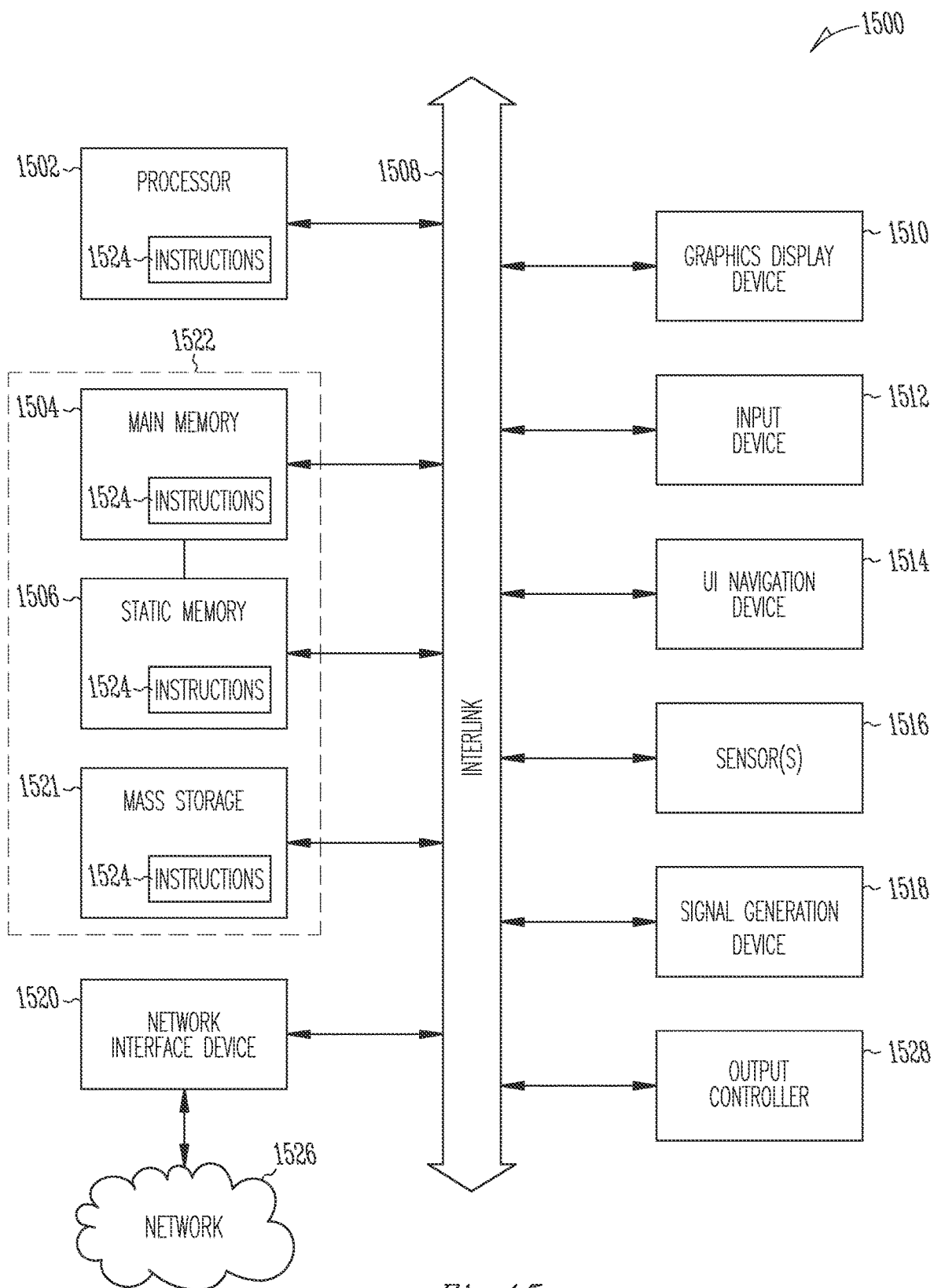
FIG. 15 illustrates a block diagram of an example machine 1500 upon which any one or more of the techniques (e.g., methodologies) discussed herein may perform.

FIG. 15 illustrates a block diagram of an example machine 1500 upon which any one or more of the techniques (e.g., methodologies) discussed herein may perform. Portions of this description may apply to the computing framework of various portions of a motor control system, such as one or more of the digital signal processor 150, the ADC 155 (either on a custom logic or a microcode engine), control circuitry 125 or an application processor, of the motor control system 100. Portions of the techniques discussed in this document, such as parametric fitting and parameter extraction, may be implemented in and executed by an application processor, a programmable logic device, or a networked computer or a cloud server.

Examples, as described herein, may include, or may operate by, logic or a number of components, or mechanisms in the machine 1500. Circuitry (e.g., processing circuitry) is a collection of circuits implemented in tangible entities of the machine 1500 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1500 follow.

In alternative embodiments, the machine 1500 may operate as a standalone device or may be connected (e.g., networked) to other machines. In a networked deployment, the machine 1500 may operate in the capacity of a server machine, a client machine, or both in server-client network environments. In an example, the machine 1500 may act as a peer machine in peer-to-peer (P2P) (or other distributed) network environment. The machine 1500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1500 may include a hardware processor 1502 (e.g., a central processing unit (CPU), a graphics processing unit (GPU), a hardware processor core, or any combination thereof), a main memory 1504, a static memory (e.g., memory or storage for firmware, microcode, a basic-input-output (BIOS), unified extensible firmware interface (UEFI), etc.) 1506, and mass storage 1508 (e.g., hard drive, tape drive, flash storage, or other block devices) some or all of which may communicate with each other via an interlink (e.g., bus) 1530. The machine 1500 may further include a display unit 1510, an alphanumeric input device 1512 (e.g., a keyboard), and a user interface (UI) navigation device 1514 (e.g., a mouse). In an example, the display unit 1510, input device 1512, and UI navigation device 1514 may be a touch screen display. The machine 1500 may additionally include a signal generation device 1518 (e.g., a speaker), a network interface device 1520, and one or more sensors 1516, such as a global positioning system (GPS) sensor, compass, accelerometer, or one or more other sensors. The machine 1500 may include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1502, the main memory 1504, the static memory 1506, or the mass storage 1508 may be, or include, a machine-readable medium 1522 on which is stored one or more sets of data structures or instructions 1524 (e.g., software) embodying or utilized by any one or more of the techniques or functions described herein. The instructions 1524 may also reside, completely or at least partially, within any of registers of the processor 1502, the main memory 1504, the static memory 1506, or the mass storage 1508 during execution thereof by the machine 1500. In an example, one or any combination of the hardware processor 1502, the main memory 1504, the static memory 1506, or the mass storage 1508 may constitute the machine-readable medium 1522. While the machine-readable medium 1522 is illustrated as a single medium, the term "machine-readable medium" may include a single medium or multiple media (e.g., a centralized or distributed database, and/or associated caches and servers) configured to store the one or more instructions 1524.

The term "machine-readable medium" may include any medium that is capable of storing, encoding, or carrying instructions for execution by the machine 1500 and that cause the machine 1500 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine-readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1524 may be further transmitted or received over a communications network 1526 using a transmission medium via the network interface device 1520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1520 may include one or more physical jacks (e.g., Ethernet, coaxial, or phone jacks) or one or more antennas to connect to the communications network 1526. In an example, the network interface device 1520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1500, and includes digital or analog communications signals or other intangible medium to facilitate communication of such software. A transmission medium is a machine-readable medium.

Various embodiments are illustrated in the figures above. One or more features from one or more of these embodiments may be combined to form other embodiments. The method examples described herein can be machine or computer-implemented at least in part. Some examples may include a computer-readable medium or machine-readable medium encoded with instructions operable to configure an electronic device or system to perform methods as described in the above examples. An implementation of such methods may include code, such as microcode, assembly language code, a higher-level language code, or the like. Such code may include computer readable instructions for performing various methods. The code can form portions of computer program products. Further, the code can be tangibly stored on one or more volatile or non-volatile computer-readable media during execution or at other times.

The above detailed description is intended to be illustrative, and not restrictive. The scope of the disclosure should, therefore, be determined with references to the appended claims, along with the full scope of equivalents to which such claims are entitled.

What is claimed is:

1. A system for monitoring an operating condition of an electric motor that includes a stator and a rotor, the system comprising:
   an excitation circuit configured to apply a drive voltage to the electric motor; and
   a processor circuit configured to:
      measure a winding current from the electric motor in response to the applied drive voltage;
      generate a parametric model to simulate the winding current; and
      determine at least one parameter of an operational state of the electric motor using the parametric model.

2. The system of claim 1, wherein the processor circuit is configured to determine the at least one motor operational state parameter by updating at least one model parameter until the simulated winding current satisfies a specific condition relative to the measured winding current.

3. The system of claim 2, wherein the drive voltage is a pulse-width modulation (PWM) voltage associated with a PWM period and a PWM frequency, wherein the processor circuit is configured to:
   extract a first current waveform of the measured winding current during a PWM period and a second current waveform of the simulated winding current during a PWM period; and
   update the at least one model parameter based on a similarity metric between the first and second current waveforms.

4. The system of claim 3, wherein the processor circuit is configured to extract the first current waveform by sampling the measured winding current during an entirety of the PWM period at a current sampling rate higher than the PWM frequency.

5. The system of claim 4; wherein the processor circuit includes a successive-approximation register analog-to-digital converter (SAR-ADC) configured to sample and digitize the measured winding current at the current sampling rate.

6. The system of claim 4, wherein the processor circuit is configured to:
   calculate an average current using the sampled measured winding current during at least a portion of a PWM period; and
   update the at least one model parameter using the calculated average current.

7. The system of claim 6; wherein the processor circuit is configured to calculate the average current using the sampled measured winding current excluding an edge portion of the PWM period corresponding temporally to a voltage-switching edge of the drive voltage.

8. The system of claim 1, wherein the at least one motor operational state parameter includes one or more of:
   a winding ratio;
   a magnetizing inductance;
   a leakage inductance;
   a winding skin depth; or
   a winding resistance.

9. The system of claim 1; wherein the drive voltage is a pulse-width modulation (PWM) voltage associated with a PWM period and a PWM frequency, the drive voltage including a voltage-switching edge representing a transition of a voltage level applied to the stator, and
   wherein the processor circuit is configured to determine the at least one motor operational state parameter using an average of the drive voltage within a PWM period.

10. The system of claim 9, wherein the processor circuit comprises:
    an analog filter configured to filter the drive voltage;
    an analog-to-digital converter configured to sample the filtered drive voltage during a PWM period at a sampling rate higher than the PWM frequency; and
    a digital filter configured to inverse-filter the sampled drive voltage;
    wherein the processor circuit is configured to compute the average drive voltage using the inverse-filtered digitized drive voltage in the PWM period.

11. The system of claim 10, wherein the analog filter is first-order resistor-capacitor (RC) filter.

12. The system of claim 10, wherein the analog filter has a first transfer function, and the digital filter has a second transfer function representing a discrete-time realization of a reciprocal of the first transfer function.

13. The system of claim 1, wherein the processor circuit is configured to generate an operating condition indication of the electric motor based at least on the determined at least one motor operational state parameter.

14. A method of monitoring an operating condition of an electric motor that includes a stator and a rotor, the method comprising:
    applying a drive voltage to the electric motor;
    measuring a winding current from the electric motor in response to the applied drive voltage;

generating a parametric model to simulate the winding current; and determining at least one parameter of an operational state of the electric motor using the parametric model.

15. The method of claim 14, wherein determining the at least one motor operational state parameter includes updating at least one model parameter until the simulated winding current satisfies a specific condition relative to the measured winding current.

16. The method of claim 15, wherein the drive voltage is a pulse-width modulation (PWM) voltage associated with a PWM period and a PWM frequency, the method comprising:

extracting a first current waveform of the measured winding current during a PWM period and a second current waveform of the simulated winding current during a PWM period; and updating the at least one model parameter based on a similarity metric between the first and second current waveforms.

17. The method of claim 16, wherein extracting the first current waveform includes sampling the measured winding current during an entirety of the PWM period at a current sampling rate higher than the PWM frequency using a successive-approximation register analog-to-digital converter (SAR-ADC).

18. The method of claim 17, comprising:

calculating an average current using the sampled measured winding current during at least a portion of a PWM period; and updating the at least one model parameter using the calculated average current.

19. The method of claim 14, wherein the drive voltage is a pulse-width modulation (PWM) voltage associated with a PWM period and a PWM frequency, the drive voltage including a voltage-switching edge representing a transition of a voltage level applied to the stator, the method comprising:

filtering the drive voltage using an analog filter;

sampling the filtered drive voltage during the PWM period at a sampling rate higher than the PWM frequency; and inverse-filtering the sampled drive voltage using a digital filter;

wherein the analog filter has a first transfer function, and the digital filter has a second transfer function representing a discrete-time realization of a reciprocal of the first transfer function.

20. The method of claim 19, wherein determining the at least one motor operational state parameter includes using an average drive voltage of the inverse-filtered digitized drive voltage in the PWM period.

21. The method of claim 14, comprising generating an operating condition indication of the electric motor based at least on the determined at least one motor operational state parameter.

22. A system for monitoring an operating condition of an electric motor that includes a stator and a rotor, the system comprising:

an excitation circuit configured to apply a drive voltage to the electric motor, the drive voltage including a pulse-width modulation (PWM) voltage having a voltage-switching edge representing a transition of a voltage level applied to the stator; and a processor circuit, including:

an analog filter configured to filter the drive voltage;

an analog-to-digital converter configured to sample the filtered drive voltage during a PWM period at a sampling rate higher than a PWM frequency; and a digital filter configured to inverse-filter the sampled drive voltage;

wherein the processor circuit is configured to generate an average drive voltage using the inverse-filtered digitized drive voltage in the PWM period, and to determine at least one at least one parameter of an operational state of the electric motor using the average drive voltage in the PWM period.

23. The system of claim 22, wherein the processor circuit is further configured to:

measure a winding current from the electric motor in response to the applied drive voltage; and estimate a rotor angle using the applied drive voltage, the measured winding current, and the determined at least one motor operational state parameter.

24. A system for monitoring an operating condition of an electric motor that includes a stator and a rotor, the system comprising:

an excitation circuit configured to apply a drive voltage to the electric motor; and a processor circuit configured to:

measure a winding current from the electric motor in response to the applied drive voltage;

determine at least one motor operational state parameter using one or more of the applied drive voltage or the measured winding current; and estimate a rotor angle using the applied drive voltage, the measured winding current, and the determined at least one motor operational state parameter.

25. The system of claim 24, wherein the drive voltage is a pulse-width modulation (PWM) voltage associated with a PWM period and a PWM frequency, and the processor circuit is configured to:

determine values of at least one model parameter at multiple different times during a PWM period;

estimate, from the values of the at least one model parameter, respective rotor angles at the multiple different times during the PWM period.

\* \* \* \* \*